(12) United States Patent
Moriwaki

(10) Patent No.: US 7,226,836 B2
(45) Date of Patent: Jun. 5, 2007

(54) METHOD OF MANUFACTURING SUBSTRATE FOR ELECTRO-OPTICAL DEVICE, SUBSTRATE FOR ELECTRO-OPTICAL DEVICE, ELECTRO-OPTICAL DEVICE, AND ELECTRONIC APPARATUS

(75) Inventor: Minoru Moriwaki, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 15 days.

(21) Appl. No.: 10/964,732

(22) Filed: Oct. 15, 2004

(65) Prior Publication Data

US 2005/0104066 A1    May 19, 2005

(30) Foreign Application Priority Data

Oct. 24, 2003    (JP) .............................. 2003-364731

(51) Int. Cl.
*H01L 21/8242*    (2006.01)

(52) U.S. Cl. ...................... 438/239; 438/250; 438/706

(58) Field of Classification Search ........ 438/239–256, 438/700–757
See application file for complete search history.

(56) References Cited

U.S. PATENT DOCUMENTS

| | | | |
|---|---|---|---|
| 6,207,465 B1 | 3/2001 | Cuchiaro et al. | |
| 6,271,082 B1* | 8/2001 | Hou et al. | 438/250 |
| 6,335,551 B2* | 1/2002 | Takemura | 257/306 |
| 6,500,678 B1* | 12/2002 | Aggarwal et al. | 438/3 |
| 6,552,384 B2* | 4/2003 | Murata et al. | 257/307 |
| 6,855,565 B2* | 2/2005 | Kanaya et al. | 438/3 |
| 6,927,124 B2* | 8/2005 | Suzuki | 438/250 |
| 2002/0036305 A1* | 3/2002 | Sameshima | 257/295 |
| 2003/0205738 A1* | 11/2003 | Kanaya et al. | 257/200 |
| 2003/0211685 A1* | 11/2003 | Ohyagi | 438/240 |
| 2005/0110062 A1* | 5/2005 | Natori et al. | 257/295 |

FOREIGN PATENT DOCUMENTS

| | | |
|---|---|---|
| JP | A 2002-100745 | 4/2002 |
| JP | 2003298022 | * 10/2003 |
| KR | 1999-0083290 | 11/1999 |

* cited by examiner

*Primary Examiner*—Savitri Mulpuri
(74) *Attorney, Agent, or Firm*—Oliff & Berridge, PLC

(57) ABSTRACT

Exemplary embodiments provide a method of manufacturing a substrate for an electro-optical device. The method includes sequentially depositing on the substrate a lower conductive layer which is a lower electrode of the capacitor, an intermediate layer which is a dielectric film of the capacitor, and an upper conductive layer which is an upper electrode of the capacitor, in which the lower conductive layer is made of a material having an etching rate lower than an etching rate of a material of the upper conductive layer with respect to a predetermined etching agent; forming a mask having a predetermined planar pattern on the upper conductive layer; patterning the upper conductive layer, the intermediate layer and the lower conductive layer by etching with the mask, in which the etching agent is applied to at least the upper conductive layer and the lower conductive layer; and removing the mask. Accordingly, it is possible to simply manufacture a high reliable capacitor on the substrate.

6 Claims, 16 Drawing Sheets

F I G. 5
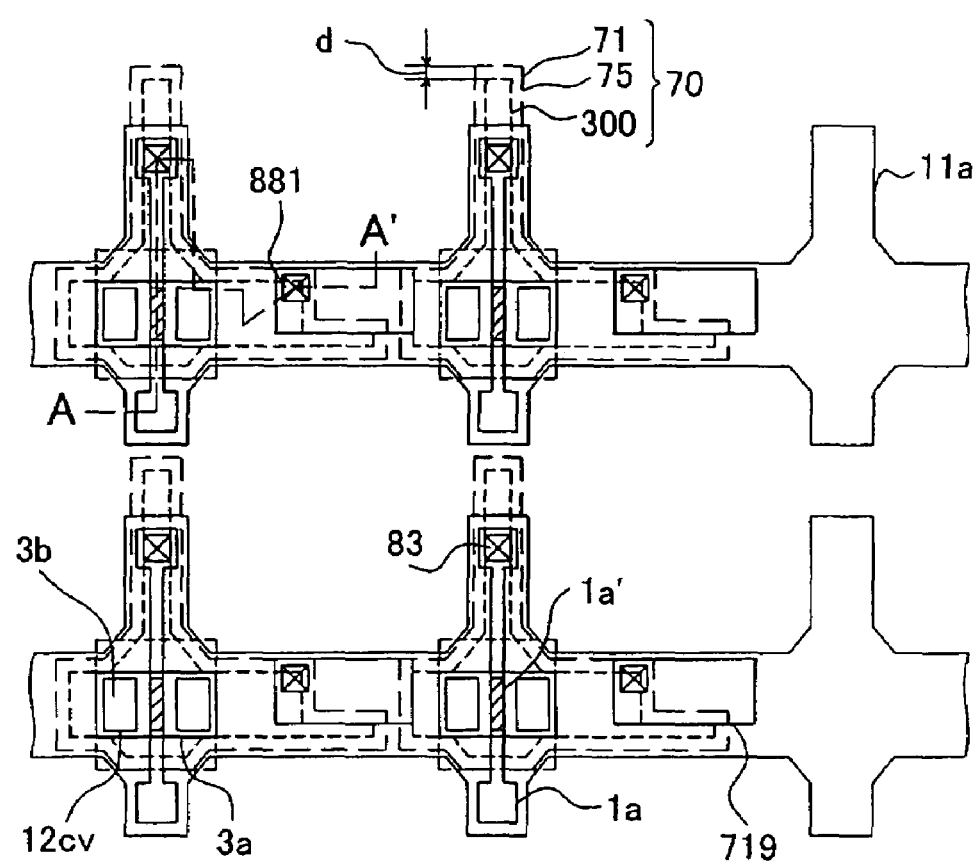

METHOD OF MANUFACTURING SUBSTRATE FOR ELECTRO-OPTICAL DEVICE, SUBSTRATE FOR ELECTRO-OPTICAL DEVICE, ELECTRO-OPTICAL DEVICE, AND ELECTRONIC APPARATUS

BACKGROUND OF THE INVENTION

1. Field of Invention

Exemplary embodiments of the present invention relate to a method of manufacturing a substrate which is used for an electro-optical device such as a liquid crystal device and has a capacitor formed thereon, the substrate for the electro-optical device, and the electro-optical device and an electronic apparatus such as a liquid crystal projector provided with the same substrate. Exemplary embodiments of the present invention also relate to a method of manufacturing a substrate which is used for a general semiconductor device and has a capacitor formed thereon, and the substrate for the semiconductor device.

2. Description of Related Art

The related art includes a manufacturing method of a substrate for electro-optical devices. The method includes forming a capacitor on a substrate and having, a lower conductive layer, an intermediate layer which is a dielectric film, and an upper conductive layer sequentially deposited on the substrate. Next, by way of etching with one mask corresponding to a planar shape of the capacitor to be formed, the capacitor consisting of a lower electrode, a dielectric film and an upper electrode is typically obtained.

The related art also includes, a method of forming a capacitor on the substrate in which the upper electrode is smaller than the lower electrode or vice versa. In this case, by way of etching with a plurality of masks, the capacitor provided with the lower electrode and the upper electrode having a different shape from each other is formed.

However, in the method of preparing the lower electrode and the upper electrode having a different shape from each other, since a plurality of masks are used to pattern the lower electrode and the upper electrode to have a different planar shape, a manufacturing process becomes complicated and advanced. Generally, one mask is prepared by forming a resist on one surface and patterning the resist by way of photolithography or etching technique. Therefore, if a plurality of masks is used, it is necessary to repeat the above steps several times. Further, whenever one mask is used, a misalignment or dimensional variations may be generated, which results in a problem that poor manufacture may be caused. As a result, the production yield will be lowered naturally.

In addition, if the upper electrode and the lower electrode are manufactured so as to have a remarkably different shape, a region for the capacitor is increased, but a capacitance is lowered. The reason is that a region actually serving as the capacitor is limited to only a region in which the upper electrode and the lower electrode are opposed to each other with the dielectric film interposed therebetween. Further, though a difference in size between the upper electrode and the lower electrode is made smaller, there is a limit in forming a fine pattern since two large-sized masks are used. Therefore, it is difficult to obtain a capacitance corresponding to the formed area. That is, in preparing a capacitor in which the upper electrode and the lower electrode having a different planar shape are formed on a limited region of the substrate, there is a technical problem in that it is out of keeping with increasing the capacitance.

Alternatively, according to a method in which the upper electrode and the lower electrode are manufactured so as to have the same planar shape, it provides a relatively simple manufacturing process, but on ends of the dielectric film of the resultant capacitor, in order to increase the capacitance, edges of the upper electrode and edges of the lower electrode are opposed to each other via only an extremely thin dielectric film, respectively. For this reason, a slight misalignment or dimensional variations, film-forming foreign substance, film remnant or film-forming defects from an incomplete etching or removal may be caused, which results in a problem in that the edge of the upper electrode and the edge of the lower electrode may be electrically shorted from a concentration of electric field.

SUMMARY OF THE INVENTION

Exemplary embodiments of the present invention address and/or solve the above discussed and/or other problems. Exemplary embodiments of the present invention to provide a method of manufacturing a substrate for an electro-optical device that is capable of simply manufacturing a highly reliable capacitor thereon, the substrate for the electro-optical device, and an electro-optical device such as a liquid crystal device and an electronic apparatus such as a liquid crystal projector having the same substrate. Exemplary embodiments of the present invention provide a substrate for a semiconductor device that is used for a general semiconductor device and has a capacitor thereon, and the substrate for the semiconductor device.

In order to address or attain the above objects, a method of manufacturing a substrate for an electro-optical device provided with a capacitor thereon according to a first exemplary embodiment of the present invention includes: sequentially depositing above the substrate, a lower conductive layer which is a lower electrode of the capacitor, an intermediate layer which is a dielectric film of the capacitor, and an upper conductive layer which is an upper electrode of the capacitor, in which the lower conductive layer is made of a material having an etching rate lower than an etching rate of a material of the upper conductive layer with respect to a predetermined etching agent; forming a mask having a predetermined planar pattern on the upper conductive layer; patterning the upper conductive layer, the intermediate layer and the lower conductive layer by etching with the mask, in which the etching agent is applied to at least the upper conductive layer and the lower conductive layer; and removing the mask.

According to the method of manufacturing the substrate for the electro-optical device of a first exemplary embodiment of the present invention, the lower conductive layer is formed above the substrate by, for example, sputtering, vapor deposition or chemical vapor deposition (CVD), the intermediate layer is formed on the lower electrode by, for example, vapor deposition or thermal oxidization, and the upper conductive layer is formed on the intermediate layer by, for example, sputtering, vapor deposition or CVD. The lower conductive layer is made of conductive material such as conductive metallic material, conductive polysilicon or conductive metallic silicide. The intermediate layer is made of insulating material such as metallic oxide film of silicon oxide, silicon nitride, $HfO_2$, $Ta_2O_5$, $TiO_2$ or MgO, or multi-layered film including at least one of these metallic oxides. The upper conductive layer is made of conductive material such as conductive metallic material, conductive polysilicon or conductive metallic silicide, like the lower conductive layer. However, in exemplary embodiments of the present invention, the lower conductive layer is made of a material having an etching rate lower than material of the upper conductive layer with respect to the predetermined etching agent. Moreover, in exemplary embodiments of the present invention, 'the etching agent' is material for proceeding a gaseous etching or a liquid etching, which is generally referred to as an etching gas or an etchant, respectively.

Subsequently, a mask having the predetermined planar pattern is formed on the upper conductive layer. For example, the mask having the predetermined planar pattern is formed by forming a resist on a surface of the upper conductive layer and then patterning the resist by photolithography or etching technique. Subsequently, by etching with the mask, the upper conductive layer, the intermediate layer and the lower conductive layer are patterned into the predetermined planar pattern of the mask. At that time, at least the upper conductive layer and the lower conductive layer are etched using the same etching agent. Since the lower conductive layer is made of a material having an etching rate lower than an etching rate of a material of the upper conductive layer, a horizontal side etching to a surface of the lower conductive layer is hardly preceded. For this reason, by etching, the edge of the upper conductive layer retreats from the edge of the lower conductive layer. As a result, the capacitor has step-shaped ends.

Moreover, if the upper conductive layer and the lower conductive layer are made of conductive polysilicon film or the like, respectively, they may be dry-etched using an etching gas containing bromide or fluorine (for example, gas containing HBr, $CF_4$, $Cl_2$ or $O_2$). Meanwhile, the intermediate layer made of silicon oxide film or silicon nitride film may be dry-etched using an etching gas to remove an oxide film (for example, gas containing $CF_4$, $O_2$ or $SF_6+CHF_3$ gas). Subsequently, the mask is removed.

As a result, the capacitor in which the upper electrode has a planar shape of one size larger than those of the lower electrode and the dielectric film can be simply formed on the substrate. In such a capacitor, it is possible to alleviate the concentration of electric field in end surfaces of the dielectric film since a distance between the upper electrode and the lower electrode is remarkably long, as compared with a capacitor in which a lower electrode, a dielectric film and an upper electrode have the same planar shape. Therefore, it is possible to remarkably reduce chances that electric short between the upper electrode and the lower electrode may be generated. Generally, end surfaces of the upper electrode and the lower electrode are adjacent to each other in the vicinities of the end surfaces of the dielectric film and thus they may easily contact each other by a manufacture error, a misalignment, dimensional variations or film remnant.

In contrast, in exemplary embodiments of the present invention, the end surfaces of the upper electrode and the lower electrode are spaced apart from each other three-dimensionally, such that the possibility of such a contact can be remarkably reduced. For this reason, it is reduced or prevented that dielectric breakdown is caused by the contact of the end surfaces of the upper electrode and the lower electrode. Further, since the upper electrode has a planar shape smaller than that of the lower electrode, it is possible to form an interlayer insulating film or the like thereon with a good coverage, and then it is possible to form a more reliable device on the substrate. Meanwhile, if the lower electrode has a planar shape smaller than that of the upper electrode, the ends of the capacitor has an overhang structure having a projected upper portion. In this case, when a layer is formed to cover such a capacitor, it is difficult to make portions close to the end surfaces of the lower electrode be covered with the layer since the end surfaces are hidden by the upper electrode, which causes voids at the portions. Therefore, a reliability of a device may be lowered.

Besides, to pattern the upper and lower electrodes constructing such an excellent capacitor, one mask may be used. That is, since the upper and lower electrodes having a different size are formed using a difference in etching rate of the upper conductive layer and the lower conductive layer, it is very advantageous for providing an efficient manufacturing process. If many masks are used, an increased number of resist film-forming, etching and removal are required, and then a manufacturing cost becomes remarkably high. Further, the production yield is lowered due to a misalignment or foreign substance. In addition, since the upper conductive layer and the lower conductive layer are etched using the same etching agent, by introducing an etching agent for the intermediate layer, the entire patterning can be performed in the same chamber. Alternatively, it is possible to collectively etch the intermediate layer with the upper conductive layer and the lower conductive layer using the same etching agent. In these cases, a course on a manufacturing line is reduced, and a manufacturing efficiency is advanced.

In such a manner, according to the manufacturing method of the substrate for the electro-optical device of the first exemplary embodiment of the present invention, it is possible to simply form a reliable capacitor on the substrate and advance the production yield.

In an aspect of the manufacturing method of the substrate for the electro-optical device of the first exemplary embodiment of the present invention, the patterning may be performed such that the upper conductive layer, the intermediate layer and the lower conductive layer are collectively etched.

According to the aspect, the upper conductive layer, the intermediate layer and the lower conductive layer are etched at one time within the same chamber. For this reason, it is possible to manufacture the capacitor more simply, and further it is possible to advance the manufacturing efficiency.

Further, in another aspect of the manufacturing method of the substrate for the electro-optical device of the first exemplary embodiment of the present invention, the patterning may be performed such that the intermediated layer is etched using an etching agent different from the etching agent.

That is, when the etching of the intermediate layer, the etching agent may be changed. Generally, the intermediate layer has an etching rate incomparably lower than that of the conductive layer against the etching agent for the conductive layer. If etching in the intermediate layer is very slow, a rate of the entire patterning is easily determined. In this case, it may be rather efficient that the etching agent for the conductive layer is replaced with an etching agent for the intermediate layer.

In the above aspects, during the patterning, it may be further provided with a mask retreating to treat the mask such that a planar shape of the mask has a smaller size simultaneously with the progression of etching.

That is, the mask is retreated simultaneously with the patterning. Here, 'the retreat of mask' means, for example, that during etching of any one of the upper conductive layer, the intermediate layer and the lower conductive layer, a height of the mask is lowered and the planar shape of the mask becomes small by etching a surface of the resist forming the mask or performing a cleaning treatment such as plasma cleaning (so called, "$O_2$ cleaning") on the surface. After or simultaneously with the mask retreating, by etching with the retreated mask, the upper conductive layer is patterned into a planar shape corresponding to the retreated mask. As a result, the end surfaces of the upper conductive layer are further retreated from an initial position of the mask, and a misalignment between the upper conductive layer and the lower conductive layer is enlarged.

Moreover, in the mask retreating, an outline of the mask may be retreated at an equal distance around a periphery of the mask on the substrate.

According to the aspect, since the outline of the mask is retreated at equal distances around the periphery of the mask in the mask retreating, it is possible to form an upper capacitor electrode having an outline smaller than a lower capacitor electrode by the equal distance around the periphery. Moreover, by adjusting a retreating distance of the mask, it is possible to adjust a difference in outline. Therefore, the lower capacitor electrode and the upper capacitor electrode that is a little smaller than the lower capacitor electrode are simply formed using one mask.

In addition, the upper conductive layer and the lower conductive layer may be made of a material having the same composition.

In exemplary embodiments of the present invention, 'the material of the same composition' is not limited up to the composition ratio, and includes material having a different etching rate with respect to a predetermined etching agent in accordance with a difference in manufacture. In this case, the upper conductive layer and the lower conductive layer have a different etching rate, for example, by changing a doping method of impurities. In an example, the lower conductive layer may be made of polysilicon into which phosphorous (P) ions are injected after film-forming, and the upper conductive layer may be made of polysilicon into which phosphorous (P) ions are injected during film-forming.

In order to attain the above objects, a method of manufacturing a substrate for an electro-optical device provided with a capacitor thereon according to a second exemplary embodiment of the present invention includes: sequentially depositing above the substrate a lower conductive layer which is a lower electrode of the capacitor, an intermediate layer which is a dielectric film of the capacitor, and an upper conductive layer which is an upper electrode of the capacitor, in which the intermediate layer is made of a material having an etching rate lower than an etching rate of a material of the lower conductive layer and the upper conductive layer with respect to a predetermined etching agent; forming a mask having a predetermined planar pattern on the upper conductive layer; collectively patterning the upper conductive layer, the intermediate layer and the lower conductive layer by etching with the mask and the predetermined etching agent; and removing the mask.

According to the method of manufacturing the substrate for the electro-optical device of the second exemplary embodiment of the present invention, when the lower conductive layer, the intermediate layer and the upper conductive layer are deposited, the intermediate layer is made of a material having an etching rate lower than an etching rate of a material of the upper conductive layer and the lower conductive layer with respect to the predetermined etching agent. By the way, the upper conductive layer and the lower conductive layer may be made of the same material or different material. That is, the upper conductive layer and the lower conductive layer may be made of a material having the same composition or different composition selected from conductive metallic material, conductive polysilicon or conductive polysilicide. For example, the upper conductive layer and the lower conductive layer may be made of phosphorous (P)-doped polysilicon. Further, the upper conductive layer and the lower conductive layer may be made of different material, in which the lower conductive layer may be made of WSi and the upper conductive layer may be made of phosphorous (P)-doped polysilicon.

Subsequently, the three layers are simultaneously patterned by collective etching. At that time, in the intermediate layer having an low etching rate, a proceeding rate of a side etching is slow, ends of at least the upper conductive layer, which is disposed on the dielectric film, of the upper conductive layer and the lower conductive layer are retreated from ends of the intermediate layer. Further, in accordance with etching conditions other than the etching rate, ends of the lower conductive layer also are retreated from the ends of the intermediate layer by the etching.

As a result, a capacitor in which the upper conductive layer or the lower conductive layer has a planar shape smaller than that of the intermediate layer can be manufactured on the substrate. In such a capacitor, it is possible to alleviate the concentration of electric field since the dielectric film shuts off between the upper electrode and the lower electrode, as compared with a capacitor in which a lower electrode, a dielectric film and an upper electrode have the same planar shape. Therefore, it is possible to remarkably reduce chances that electric short between the upper electrode and the lower electrode may be generated. Generally, end surfaces of the upper electrode and the lower electrode are adjacent to each other in the vicinities of the end surfaces of the dielectric film and thus they may easily contact each other by a manufacture error, a misalignment, dimensional variations or film remnant.

In contrast, in exemplary embodiments of the present invention, the end surfaces of the upper electrode and the lower electrode are physically shut off from each other, such that the possibility of such a contact can be remarkably reduced. For this reason, it is reduced or prevented that dielectric breakdown is caused by the contact of the end surfaces of the upper electrode and the lower electrode.

Besides, to pattern the layers constructing such an excellent capacitor, just once etching may be required. That is, in exemplary embodiments of the present invention, the patterning is collectively performed using the same device, chamber and etching agent, by using a difference in etching rate of the upper conductive layer, the lower conductive layer and the intermediate layer. Therefore, it is very advantageous for providing an efficient manufacturing process. At the same time, since just one mask is enough for etching, the manufacturing cost can also be reduced. If etching is performed several times, an increased number of resist film-forming and removal steps are required, and then a manufacturing cost becomes remarkably high. Further, the production yield is lowered due to a misalignment or foreign substance.

In such a manner, according to the method of manufacturing the substrate for the electro-optical device of the second exemplary embodiment of the present invention, it is possible to manufacture a highly reliable capacitor on the substrate, and it is possible to advance the production yield.

In the layer forming, the lower conductive layer may be made of a material having an etching rate lower than an etching rate of a material of the upper conductive layer with respect to the predetermined etching agent.

According to the aspect, it is possible to allow the end surfaces of the lower conductive layer to be retreated too much from the end surfaces of the intermediate layer. From a view of pressure resistance of the capacitor, it is important that the end surfaces of any one of the upper electrode and the lower electrode are retreated from the end surfaces of the dielectric film. In this case, it is not necessary for the lower and upper electrodes to have the end surfaces to be retreated from the end surfaces of the dielectric film. However, if the lower electrode has a planar shape smaller than that of the dielectric film, ends of the capacitor has an overhang structure. In this case, when a layer is formed to cover such a capacitor, it is difficult to make portions close to the end surfaces of the lower electrode be covered with the layer since the end surfaces are hidden by the dielectric film, which causes voids at the portions. Therefore, it is likely to cause a reliability of a device to be reduced. For this reason, it is preferable to make the planar shape of the lower electrode not so small to that of the dielectric film. That is, the end surfaces of the upper conductive layer are retreated from the end surfaces of the intermediate layer, but the end surfaces of the lower conductive layer are retreated not so much from the end surfaces of the intermediate layer.

In order to attain the objects, there is provided a substrate for an electro-optical device of the present invention, which is manufactured by the method of manufacturing the substrate for the electro-optical device of the present invention described above (including various exemplary aspects), and in which the lower electrode, the dielectric film and the upper electrode are sequentially deposited on the substrate and the upper electrode has a planar shape smaller than that of the dielectric film.

According to the substrate for the electro-optical device of exemplary embodiments of the present invention, it is possible to alleviate the concentration of electric field in end surfaces of the dielectric film since a distance between the upper electrode and the lower electrode is remarkably long, as compared with a capacitor in which a lower electrode, a dielectric film and an upper electrode have the same planar shape. Therefore, it is possible to remarkably reduce chances that electric short between the upper electrode and the lower electrode may be generated. Generally, end surfaces of the upper electrode and the lower electrode are adjacent to each other in the vicinities of the end surfaces of the dielectric film and thus they may easily contact each other by a manufacture error, a misalignment, dimensional variations or film remnant. To the contrary, in exemplary embodiments of the present invention, the end surfaces of the upper electrode and the lower electrode are spaced apart from each other three-dimensionally, such that the possibility of such a contact can be remarkably reduced.

Moreover, in the present invention, the substrate for the electro-optical device may be formed on, for example, a glass substrate or a quartz substrate.

In such a manner, the substrate for the electro-optical device having a highly reliable storage capacitor thereon is realized.

In an exemplary aspect of the substrate for the electro-optical device, edges of the upper electrode are retreated from edges of the dielectric film by a length in a range of 0.2 μm to 1 μm.

According to the exemplary aspect, the upper electrode is retreated by a predetermined length from the dielectric film around the periphery and is spaced apart from the lower electrode by at least a predetermined distance, in which the dielectric film is interposed between the upper electrode and the lower electrode. If a gap between the upper electrode and the dielectric film, that is, a spaced distance between the upper electrode and the dielectric film, is less than 0.2 μm, it is easy to cause defective dielectric or electric short. Further, if the misalignment between the upper electrode and the dielectric film is more than 1 μm, an area of the upper electrode undesirably becomes small, and thus a capacitance becomes small. Therefore, by making the misalignment between the upper electrode and the dielectric film in the range of 0.2 μm to 1 μm, it is possible to reduce chances that a defective capacitor is manufactured, and further it is possible to secure a maximum capacitance. That is, it is possible to form a relatively large capacitance in a limited region.

In the above aspects, the upper electrode may be mad of polysilicon to which phosphorous (P) is added during a film-forming, and the lower electrode may be made of polysilicon into which phosphorous (P) ions are injected.

In this case, the upper electrode and the lower electrode may not only be made of a material suitable for the electrodes such as polysilicon, which is a mother material, but have a different etching rate by changing a doping method of impurities. Besides, in this case, the lower conductive layer is formed by injecting phosphorous (P) ions after film-forming of a polysilicon film and the upper conductive layer is made of polysilicon to which phosphorous (P) is added by film-forming with CVD while adding phosphine (PH$_3$), such that the lower electrode is made of a material having an etching rate lower than that of a material of the upper electrode. For this reason, in the capacitor manufactured by etching these layers, it is possible to reduce or prevent ends from being shaped in an overhang structure and it is possible to form an interlayer insulating film or the like on the capacitor with a good coverage. Therefore, it can be reduced or prevented that a reliability of a device is lowered due to the voids or the like.

In order to attain the above objects, an electro-optical device of the present invention includes the substrate for the electro-optical devices of the present invention described above (including various exemplary aspects).

The electro-optical device of the present invention which is provided with the substrate for the electro-optical device of the present invention described above has a capacitor which is high reliable and has an excellent capacitance. Accordingly, it is possible to construct the electro-optical device, such as a liquid crystal device or an organic EL device, which is capable of high quality display.

In an exemplary aspect of the present invention, the electro-optical device is further provided with a pixel electrode arranged in an image display region on the substrate and connected to the lower electrode, a thin film transistor formed below the lower electrode with an interlayer insulating film therebetween, a source electrode and a drain electrode of the thin film transistor being connected to the lower via contact holes formed in the interlayer insulating film, wherein the capacitor is arranged within a non-opening region of a pixel.

According to the exemplary aspect, the capacitor of the present invention is used as a storage capacitor that raises a property for holding a potential and temporarily storing the potential based on an image signal. By using the non-opening region of the pixel, it is possible to implement a highly reliable electro-optical device provided with a storage capacitor having an excellent capacitance and capable of high quality display.

In particular, the dielectric film may include nitride film or oxide-nitride film.

For example, nitrides such as silicon nitride (SiN) are widely used for a dielectric or an insulator, but they are colorful and translucent. For these reasons, if the nitrides are applied for the dielectric film of the capacitor and formed on an entire surface of the image display region, the transmittance in an opening region is lowered, which results in a problem that a brightness is decreased or a display color is tilted. However, in the present invention, it is possible to use the nitrides such that they do not influence display. Moreover, the dielectric film may be made of a single or multi-layered nitride film, or a laminated film including the nitride film.

In order to attain the above objects, an electronic apparatus of the present invention is provided with the electro-optical device of the present invention described above (including various exemplary aspects).

The electronic apparatus of exemplary embodiments of the present invention provided with the electro-optical device of the present invention described above can be realized as various electronic apparatuses, which are high reliable and capable of high quality display, such as a projection-type display device, a liquid crystal television, a cellular phone, an electronic organizer, a word processor, a view finder type or monitor direct viewing type video tape recorder, a workstation, a videophone, a POS terminal or a touch panel. Further, the electronic apparatus of the present invention can be realized as an electrophoretic device such as an electronic paper, a display device using an electron-emitting element such as field-emission display and surface-conduction electron-emitter display.

In order to attain the above objects, a substrate for a semiconductor device provided with a capacitor thereon according to a first exemplary embodiment of the present invention includes: sequentially depositing above the substrate a lower conductive layer which is a lower electrode of the capacitor, an intermediate layer which is a dielectric film of the capacitor, and an upper conductive layer which is an upper electrode of the capacitor, in which the lower conductive layer is made of a material having an etching rate lower than an etching rate of a material of the upper conductive layer with respect to a predetermined etching agent; forming a mask having a predetermined planar pattern on the upper conductive layer; patterning the upper conductive layer, the intermediate layer and the lower conductive layer by etching with the mask, in which the etching agent is applied to at least the upper conductive layer and the lower conductive layer; and removing the mask.

According to the method of manufacturing the substrate for the semiconductor device of the first exemplary embodiment of the present invention, the capacitor is formed similarly to the manufacturing method of the substrate for the electro-optical device of the first exemplary embodiment of the present invention described above. That is, the lower conductive layer, the intermediate layer and the upper conductive layer are sequentially deposited on the substrate and then etched using the same mask. In the present invention, the lower conductive layer is made of a material having an etching rate lower than that of a material of the upper conductive layer with respect to the predetermined etching agent, and at least the upper conductive layer and the lower conductive layer are etched with the etching agent. As a result, edges of the upper conductive layer are retreated from edges of the lower conductive layer.

In such a capacitor, a distance between the upper electrode and the lower electrode is remarkably long in end surfaces of the dielectric film, whereby electric short between the upper electrode and the lower electrode or a dielectric breakdown is reduced or prevented. Further, since the upper electrode has a planar shape smaller than that of the lower electrode, it is possible to form an interlayer insulating film or the like thereon with a good coverage, and then it is possible to form a more reliable device. Besides, by using a difference in etching rate of the upper conductive layer and the lower conductive layer, the upper and lower electrodes having a different size are patterned with the same mask, and thus it is very advantageous for providing an efficient manufacturing process.

In order to attain the above objects, a method of manufacturing a substrate for a semiconductor device provided with a capacitor thereon according to a second exemplary embodiment of the present invention includes: sequentially depositing above the substrate a lower conductive layer which is a lower electrode of the capacitor, an intermediate layer which is a dielectric film of the capacitor, and an upper conductive layer which is an upper electrode of the capacitor, in which the intermediate layer is made of a material having an etching rate lower than an etching rate of a material of the lower conductive layer and the upper conductive layer with respect to a predetermined etching agent; forming a mask having a predetermined planar pattern on the upper conductive layer; collectively patterning the upper conductive layer, the intermediate layer and the lower conductive layer by etching with the mask and the predetermined etching agent; and removing the mask.

According to the method of manufacturing the substrate for the semiconductor device of the second exemplary embodiment of the present invention, the intermediate layer is made of a material having an etching rate lower than an etching rate of a material of the lower conductive layer and the upper conductive layer with the predetermined etching agent, and the respective layers are simultaneously patterned by a collective etching with the etching agent. As a result, it is possible to manufacture the capacitor on the substrate, in which the upper electrode or the lower electrode has a planar shape smaller than that of the dielectric film. In such a capacitor, since the dielectric film shuts off between the upper electrode and the lower electrode, it is possible to reduce or prevent electric short between the upper electrode and the lower electrode or a dielectric breakdown. Besides, since the etching for patterning uses a difference in etching rate of the upper conductive layer, the lower conductive layer and the intermediate layer, and is performed using the same mask and etching agent in the same device and chamber, it is advantageous for an efficient manufacturing process.

In order to attain the objects, there is provided a substrate for a semiconductor device of the present invention, which is manufactured by the method of manufacturing the substrate for the semiconductor device of the present invention described above, including various exemplary aspects, and in which the lower electrode, the dielectric film and the upper electrode are sequentially deposited on the substrate and the upper electrode has a planar shape smaller than that of the dielectric film.

According to the substrate for the semiconductor device of the present invention, a distance between the upper electrode and the lower electrode is remarkably long in end surfaces of the dielectric film, whereby electric short between the upper electrode and the lower electrode or a dielectric breakdown is reduced or prevented. Therefore, it is possible to provide the substrate for the semiconductor device provided with a highly reliable capacitor. Moreover, the substrate for the semiconductor of the present invention is formed on a wafer (semiconductor substrate).

BRIEF DESCRIPTION OF THE DRAWINGS

FIG. 5 is a schematic plan view of partially selected elements for showing a construction of a storage capacitor in FIG. 4;

DETAILED DESCRIPTION OF PREFERRED EMBODIMENTS

First Exemplary Embodiment

Exemplary embodiments of the present invention will be now described with reference to the drawings. In the exemplary embodiments, an electro-optical device of the present invention is applied to a liquid crystal device.

Entire Construction of Electro-Optical Device

Figure 1:
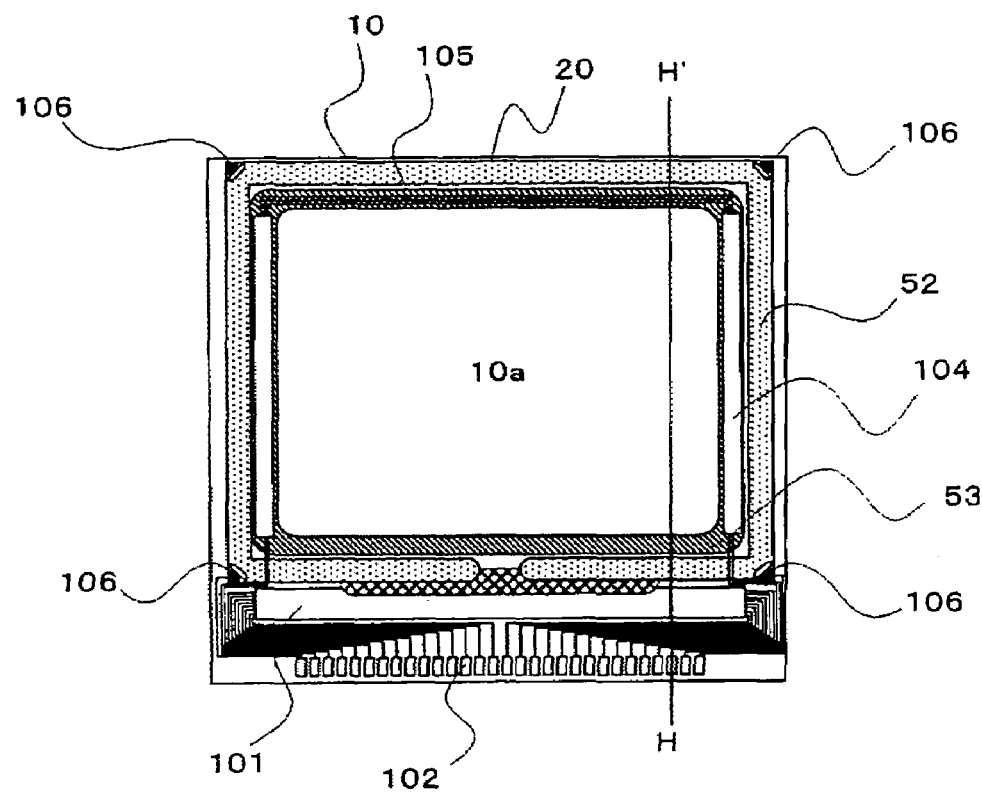
FIG. 1 is a schematic plan view showing an entire construction of an electro-optical device.
Figure 2:
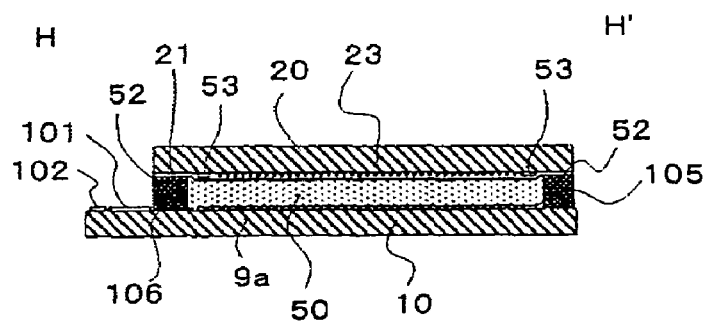
FIG. 2 is a schematic cross-sectional view taken along the line H–H' of FIG. 1.

First, an entire construction of the electro-optical device of exemplary embodiments of the present invention will be described with reference to FIGS. 1 and 2. FIG. 1 is a schematic plan view of the electro-optical device showing a TFT array substrate and elements formed thereon, as seen from a counter substrate. FIG. 2 is a schematic cross-sectional view taken along the line H–H' of FIG. 1. Herein, a TFT active matrix type liquid crystal device in which driving circuits are built is used as an example of the electro-optical device.

Referring to FIGS. 1 and 2, in the electro-optical device according to the present exemplary embodiment, a TFT array substrate 10 and a counter substrate 20 are arranged to oppose each other. Between the TFT array substrate 10 and the counter substrate 20, a liquid crystal layer 50 is sealed. The TFT array substrate 10 and the counter substrate 20 are bonded to each other by a sealing material 52 which is provided at a sealing region around a periphery of an image display region 10a.

The sealing material 52 for bonding the TFT array substrate 10 and the counter substrate 20 is made of, for example, ultraviolet curable resin or thermosetting resin. In a manufacturing process, the sealing material 52 is applied on the TFT array substrate 10, and then cured by ultraviolet irradiation or heating. Further, in the sealing material 52, to maintain a gap between the TFT array substrate 10 and the counter substrate 20 with a predetermined value, gap materials such as glass fibers or glass beads are distributed. Further, if the liquid crystal device is one that performs unmagnified display in a large-sized liquid crystal device such as a liquid crystal display or a liquid crystal television, the gap materials may be included in the liquid crystal layer 50.

Parallel with an inner side of the sealing region at which the sealing material 52 is disposed, a frame light-shielding film 53 defining a frame region of the image display region 10a, is provided at the counter substrate 20 side. However, a portion or an entire portion of the frame light-shielding film 53 may be embedded in the TFT array substrate 10.

In a region outside the sealing region on which the sealing material 52 is arranged, a data line driving circuit 101 and external circuit connecting terminals 102 are provided along a side of the TFT array substrate 10. Further, scanning line driving circuits 104 are provided along two sides adjacent to the side such that the scanning line driving circuits 104 are covered with the frame light-shielding film 53. In addition, to connect the two scanning line driving circuits 104 disposed at both sides of the image display region 10a, a plurality of wires 105 are provided along a remaining side of the TFT array substrate 10 such that the plurality of the wires are covered with the frame light-shielding film 53.

In four corners of the counter substrate 20, vertically conducting materials 106, each functioning as a vertically conducting terminal between both substrates, are disposed. Further, in regions of the TFT array substrate 10 opposing the corners, vertically conducting terminals are provided. In such a construction, it is possible to electrically connect the TFT array substrate 10 to the counter substrate 20.

In FIG. 2, after TFTs to switch pixels or wires such as scanning lines and data lines are formed on the TFT array substrate 10, an alignment film is formed on pixel electrodes 9a. Meanwhile, on the counter substrate 20, counter electrodes 21, a light shielding film 23 in a lattice or stripe shape, an alignment film formed on an uppermost or the like, are formed. Further, the liquid crystal layer 50 is made of, for example, one or more nematic liquid crystal materials, and is aligned in a predetermined direction between a pair of the alignment films.

Moreover, on the TFT array substrate 10 shown in FIGS. 1 and 2, in addition to the data line driving circuit 101 and the scanning line driving circuits 104, a sampling circuit to sample an image signal on image signal lines and to supply the sampled image signal to the data lines, a precharge circuit to supply a precharge signal having a predetermined voltage level to the data lines prior to the sampled image signal, a test circuit to test a quality and defect of the electro-optical device during the manufacturing process or when shipping may be formed.

Construction in Pixel Portion

Figure 3:
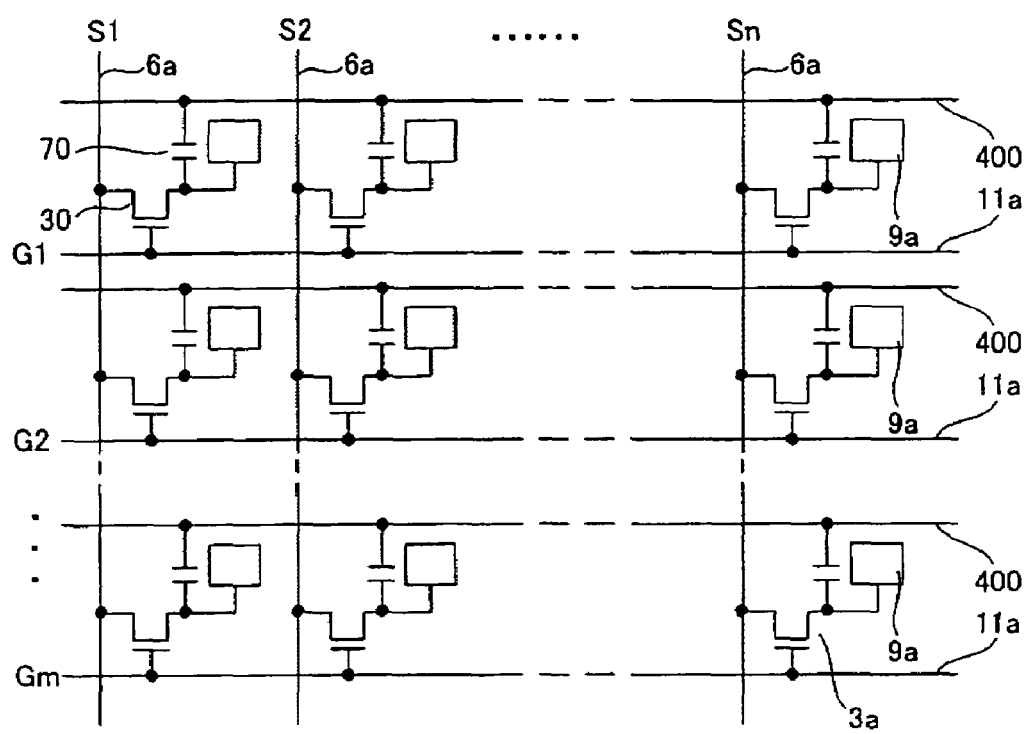
FIG. 3 is an equivalent schematic circuit diagram of various elements, wires or the like in a plurality of pixel portions which is arranged in a matrix type and constitutes an image display region of the electro-optical device.
Figure 4:
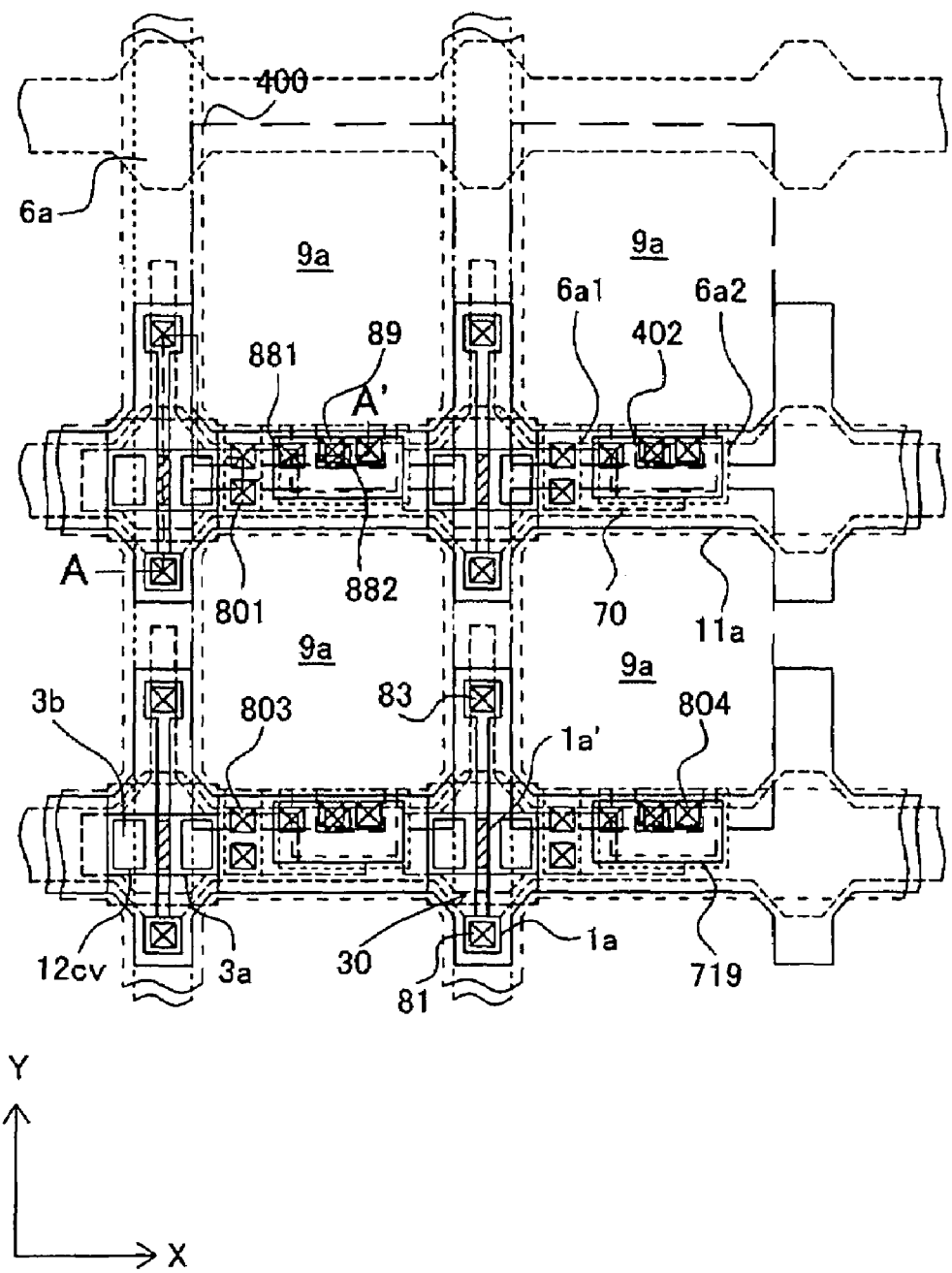
FIG. 4 is a schematic plan view of a group of a plurality of adjacent pixels on a TFT array substrate on which data lines, scanning lines, pixel electrodes or the like are formed.
Figure 6:
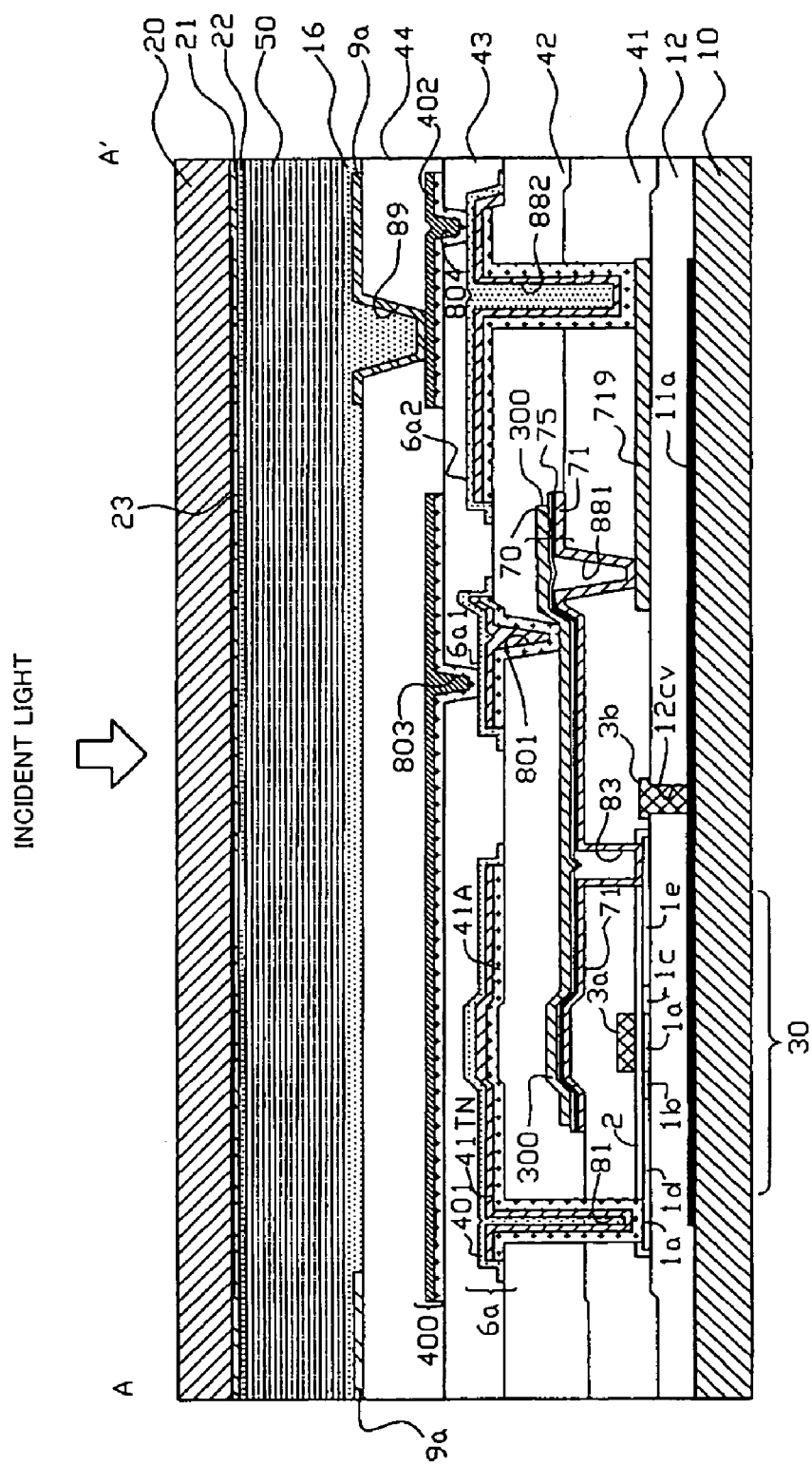
FIG. 6 is a schematic cross-sectional view taken along the line A–A' of FIG. 4.

A construction in a pixel portion of the electro-optical device in the exemplary embodiment of the present invention will be now described with reference to FIGS. 3 to 7. FIG. 3 is an equivalent schematic circuit diagram of various elements, wires or the like in a plurality of pixels which is formed in a matrix type and constitutes an image display region of the electro-optical device. FIG. 4 is a schematic plan view of a group of a plurality of adjacent pixels on a TFT array substrate on which data lines, scanning lines, pixel electrodes or the like are formed. FIG. 5 is a schematic plan view of partially selected elements for showing a construction of FIG. 4, in particular, a storage capacitor. In addition, FIG. 6 is a schematic cross-sectional view taken along the line A–A' of FIG. 4. Moreover, in FIG. 6, to make each layer and each member to be sufficiently understandable size, each layer and each member is shown in a different scale.

Circuit Construction of Pixel Portion

In FIG. 3, in each of a plurality of pixels which is arranged in a matrix type and constitutes the image display region of the electro-optical device according to the present exemplary embodiment, a pixel electrode 9a and a TFT 30 to switch the pixel electrode 9a are formed, and a source of the TFT 30 is electrically connected to the data line 6a to which the image signal is supplied. The image signals S1, S2, . . . , Sn to be written in the data lines 6a, may be sequentially supplied to the data lines 6a or may be supplied in a group to a plurality of adjacent data lines 6a.

Further, a gate of the TFT 30 is electrically connected to a gate electrode 3a, and thus scanning signals G1, G2, . . . , Gm are sequentially applied to the scanning lines 11a and the gate electrodes 3a at a predetermined time interval as a pulse. The pixel electrode 9a is electrically connected to a drain of the TFT 30, and by turning on the TFT 30 serving as a switching element for a predetermined period, the image signals S1, S2, . . . , Sn supplied from the data lines 6a are written in the pixel electrodes 9a at a predetermined time interval.

The image signals S1, S2, . . . , Sn of a predetermined level written in liquid crystal as the electro-optical material via the pixel electrodes 9a, are held between the pixel electrode 9a and the counter electrodes formed on the counter substrate for a predetermined period. An alignment or order of liquid crystal molecules is changed in accordance with an applied voltage level, and light is modulated, whereby it is possible to display gray scales. In a normally white mode, for each pixel, transmittance with respect to incident light is decreased in accordance with the applied voltage. In a normally black mode, for each pixel, transmittance with respect to incident light is increased in accordance with the applied voltage. As a whole, contrast of light emitted from the electro-optical device corresponds to the image signal.

Here, in order to reduce or prevent the held image signal from leaking, storage capacitors 70 are added parallel to liquid crystal capacitors which are formed between the pixel electrodes 9a and the counter electrodes. The storage capacitors 70 are provided parallel to the scanning lines 11a, capacitor electrodes having fixed potential are connected to capacitor wires 400 which are fixed as a constant potential.

Specific Construction of Pixel Portion

Hereinafter, a specific construction of the electro-optical device in which the above-mentioned operations are implemented by the data lines 6a, the scanning lines 11a, the gate electrodes 3a, and the TFT 30, will be now described with reference to FIGS. 4 to 6.

First, in FIG. 4, a plurality of the pixel electrodes 9a are arranged in a matrix type on the TFT array substrate 10. On boundaries of the pixel electrodes 9a in vertical and horizontal directions, the data lines 6a and the scanning lines 11a are provided. The data lines 6a are made of a laminated structure including an aluminum film as described below, and the scanning lines 11a are made of, for example, conductive polysilicon film. Further, the scanning lines 11a are electrically connected to the gate electrodes 3a opposing channel regions 1a' of semiconductor layers 1a which are indicated by shaded portions in the drawing via contact holes 12cv, and each of the gate electrodes 3a is included in the corresponding scanning line 11a. That is, the TFTs 30 to switch pixels are provided at intersections of the gate electrodes 3a and the data lines 6a, in which the gate electrodes 3a included in the scanning lines 11a oppose the channel regions 1a'. In such a manner, the TFTs 30 (excluding the gate electrodes) are disposed between the gate electrodes 3a and the scanning lines 11a.

Next, as shown in FIG. 6, the electro-optical device is provided with the TFT array substrate 10 made of, for example, a quartz substrate, a glass substrate, and a silicon substrate, and the counter substrate 20 made of a glass substrate or a quartz substrate opposing the TFT array substrate 10.

On the TFT array substrate 10, as shown in FIG. 6, the pixel electrodes 9a are provided, and thereon, an alignment film 16 is provided, on which a predetermined alignment treatment such as a rubbing treatment is performed. The pixel electrodes 9a are made of a transparent conductive film such as ITO. Meanwhile, on the counter substrate 20, the counter electrode 21 is provided over the entire surface, and thereunder, an alignment film 22 is provided, on which a predetermined alignment treatment such as a rubbing treatment is performed. The counter electrode 21 is made of a transparent conductive film such as ITO, similar to the above-mentioned pixel electrodes 9a.

Between the TFT array substrate 10 and the counter substrate 20 which are opposed to each other, electro-optical material such as liquid crystal is sealed into a space surrounded by the sealing material 52 (see FIGS. 1 and 2) to form the liquid crystal layer 50. The liquid crystal layer 50 has a predetermined alignment by the alignment films 16 and 22 in a state in which electric field is not applied thereto from the pixel electrodes 9a.

On the other hand, on the TFT array substrate 10, a laminated structure of various elements including the pixel electrodes 9a and the alignment film 16 are provided. As shown in FIG. 6, the laminated structure includes a first layer including the scanning lines 11a, a second layer including the TFTs 30 having the gate electrodes 3a or the like, a third layer including the storage capacitors 70, a fourth layer including the data lines 6a or the like, a fifth layer including the capacitor wires 400 or the like, and a sixth layer (uppermost layer) including the pixel electrodes 9a and the alignment film 16. Further, a base insulating film 12 between the first layer and the second layer, a first interlayer insulating film 41 between the second layer and the third layer, a second interlayer insulating film 42 between the third layer and the fourth layer, a third interlayer insulating film 43 between the fourth layer and the fifth layer, and a fourth interlayer insulating film 44 between the fifth layer and the sixth layer are respectively provided from below, whereby electric short between the respective layers can be reduced or prevented. Further, in the insulating films 12, 41, 42, 43 and 44, contact holes are provided to electrically connect, for example, highly doped source regions 1d of the semiconductor layers 1a of the TFTs 30 to the data lines 6a. These elements will be now described from below.

Construction of First Layer of Laminated Structure—Scanning Lines or the Like

First, in the first layer, the scanning lines 11a made of metallic simple substance, alloy, metallic silicide, polysilicide containing at least one of metallic material having a high melting point such as Ti, Cr, W, Ta, and Mo, and a laminated structure thereof or conductive polysilicon are provided. The scanning lines 11a are patterned in a stripe shape along an X direction of FIG. 4 in plan view. In detail, each of the stripe-shaped scanning lines 11a is provided with a main line extending along the X direction of FIG. 4 and protrusions extending in a Y direction of FIG. 4 on which the data lines 6a or the capacitor wires 400 are arranged. Moreover, the protrusions extending from adjacent scanning lines 11a are not connected to each other, and thus the scanning lines 11a are separately shaped one by one.

Construction of Second Layer of Laminated Structure—TFT or the Like

Next, as the second layer, the TFTs 30 including the gate electrodes 3a, are provided. As shown in FIG. 6, the TFTs 30 have an LDD (Lightly Doped Drain) structure, and includes, as elements, the above-mentioned gate electrodes 3a, the channel regions 1a' of the semiconductor layers 1a made of polysilicon in which channels are formed by an electric field from the gate electrodes 3a, an insulating film 2 including a gate insulating film to electrically isolate the gate electrodes 3a from the semiconductor layers 1a, low doped source regions 1b and low doped drain regions 1c in the semiconductor layer 1a, and highly doped source regions 1d and highly doped drain regions 1e.

Further, in the present exemplary embodiment, relay electrodes 719 made of the same film as that of the gate electrodes 3a are provided on the second layer. As shown in FIG. 4, each of the relay electrodes 719 has an island shape in a plan view such that it is positioned at an approximately center of one side extending along an X direction of the pixel electrode 9a. The relay electrodes 719 and the gate electrodes 3a are made of the same film, and thus if the gate electrodes 3a are made of a conductive polysilicon film, for example, the relay electrodes 719 are also made of a conductive polysilicon film.

Moreover, the TFTs 30 preferably have the LDD structure as shown in FIG. 6. However, the TFTs 30 may have an offset structure in which impurities are not injected into the low doped source regions 1b and the low doped drain regions 1c or a self-alignment structure in which the highly doped source regions 1d and the highly doped drain regions 1e are formed by highly doping impurities with the gate electrodes 3a as a mask.

Construction Between First Layer and Second Layer of Laminated Structure—Base Insulating Film On the scanning lines 11a and under the TFTs 30, a base insulating film 12 made of, for example, a silicon oxide film, is provided. The base insulating film 12, in addition to electrically isolating the TFTs 30 from the scanning lines 11a, functions to reduce or prevent a change in characteristics of the TFTs 30 to switch the pixels caused by roughness in a surface polishing of the TFT array substrate 10 or stain after cleaning since it is formed on an entire surface of the TFT array substrate 10.

In the base insulating film 12, on both axes of each of the semiconductor layers 1a, recess-shaped contact holes 12cv are formed along a longitudinal direction of the channel of the semiconductor layer 1a extending along the data lines 6a described below. The gate electrodes 3a corresponding to the contact holes 12cv include concave portions at the lower side in a plan view. Further, since the gate electrodes 3a are formed so as to fully fill the contact holes 12cv, the gate electrodes 3a have sidewall portions 3b which are incorporated with the gate electrodes 3a. In such a manner, the semiconductor layers 1a of the TFTs 30 are covered from the side in a plan view as shown in FIG. 4, and thus light incident at least on the side, are shut off.

Further, the sidewall portions 3b are formed so as to fill the contact holes 12cv and lower ends of the sidewall portions 3b are in contact with the scanning lines 11a. Here, since the scanning lines 11a are formed in a stripe shape as described above, the gate electrodes 3a and the scanning line 11a of any row maintain equipotential constantly, as long as they are directed only to the corresponding row.

Construction of Third Layer of Laminated Structure—Storage Capacitor or the Like In the third layer subsequent to the second layer described above, the storage capacitors 70 are provided. The storage capacitor 70 includes a lower electrode 71, as a capacitor electrode of pixel potential side, which is connected to the highly doped drain region 1e of the TFT 30 and the pixel electrode 9a, and a capacitor electrode 300 as a capacitor electrode of fixed potential side, with a dielectric film 75 interposed therebetween. As seen from the schematic plan views of FIGS. 4 and 5, since the storage capacitor 70 according the present exemplary embodiment is formed not to reach a light transmissive region substantially corresponding to a forming region for the pixel electrode 9a (in other words, to be held within a light-shielding region), an aperture ratio of each of the pixels of the entire electro-optical device is maintained relatively large, and thus it is possible to display more bright images.

More detail, the lower electrode 71 includes a single or multi-layered film made of metallic material or alloy, conductive polysilicon or conductive metallic silicide (for example, WSi). Herein, as a specific example, the lower electrode 71 includes polysilicon into which phosphorous (P) ions are injected. The film thickness of the lower electrode 71 is in a range of about 150 to 300 nm. Moreover, the lower electrode 71 functions as a relay electrode to relay-connect the pixel electrode 9a to the highly doped drain region 1e of the TFT 30, as well as the capacitor electrode of pixel potential side. In addition, the relay electrode 719 performs the relay connection.

The dielectric film 75 consists of insulating material such as silicon oxide of HTO (High Temperature Oxide) or LTO (Low Temperature Oxide), or silicon nitride, in which the film thickness is relatively thin in a range of about 10 to 30 nm. The nitride films made of silicon nitride (SiN) are widely used as a dielectric or insulator, but they are colorful and translucent. For these reasons, if the dielectric film containing nitrides is formed on an entire surface of the image display region, the transmittance in an opening region of a pixel is lowered, which results in a problem that brightness is decreased or a display color is tilted. However, in the present exemplary embodiment, since the dielectric film 75 containing nitrides is formed within the non-opening of the pixel, there is no having influence on display. In such a manner, nitrides having an excellent precision may be used as the dielectric film 75.

In more detail, the dielectric film 75 has a two-layered structure of a lower layer made of silicon oxide film and an upper layer made of silicon nitride film. The dielectric film 75 may have a three-layered structure of silicon oxide film, silicon nitride film and silicon oxide film or more multi-layered structure, or a structure having at least one metallic oxide film of $HfO_2$, $Ta_2O_5$, $TiO_2$ or MgO. Of course, the dielectric film 75 may have a single-layered structure.

The capacitor electrode 300 functions as a capacitor electrode of fixed potential side in the storage capacitor 70. In the present exemplary embodiment, the capacitor electrode 300 is electrically connected to the capacitor wire 400 (described below) of fixed potential side, thereby having fixed potential. In addition, the capacitor electrode 300 has a function for shielding light to be incident on the upper side of the TFT 30. Further, material of the capacitor electrode 300 is selected from metallic material or alloy, conductive polysilicon, and conductive metallic silicide (for example, WSi), similarly to the lower electrode 71, and the film thickness of the capacitor electrode 300 is in a range of about 150 to 300 nm.

In addition, in the present exemplary embodiment, in the lower electrode 71 and the capacitor electrode 300, material of the lower electrode 71 has an etching rate lower than an etching rate of a material of the capacitor electrode 300 with respect to the same etching agent (that is, etching gas or etchant). If such a condition is satisfied, the lower electrode 71 and the capacitor electrode 300 may be made of the same conductive material or a different conductive material. Herein, as a specific example, the capacitor electrode 300 is made of polysilicon in which phosphorous (P) is doped during film forming. That is, the lower electrode 71 is made of a material having an etching rate lower than that of a material of the capacitor electrode 300 with respect to an etching gas for polysilicon such as a mixed gas of chlorine ($Cl_2$) and hydrogen bromide (HBr). Moreover, it is well known that an etching rate is high as phosphorous (P) is highly doped. Thus, constructions of materials of the capacitor electrode 300 and the lower electrode 71 may be adjusted in accordance with a doping amount of phosphorous (P).

As shown in FIGS. 5 and 6, in the storage capacitor 70, the upper capacitor electrode 300 has a planar shape smaller than that of the dielectric film 75, and the lower electrode 71 has the same planar shape as that of the dielectric film 75. In the storage capacitor 70 in which the upper electrode has a planar shape one size smaller than that of the lower electrode or the dielectric film, a distance between the upper electrode 300 and the lower electrode 71 is remarkably long in end surfaces of the dielectric film 75, as compared to a capacitor in which a lower electrode, a dielectric film and a lower electrode have the same planar shape and thus, it is possible to alleviate a concentration of electric field. Therefore, it is possible to remarkably reduce chances that electric short between the upper electrode and the lower electrode may be generated, and it can be reduced or prevented that dielectric breakdown is caused by the contact of the end surfaces of the upper electrode and the lower electrode.

In the present exemplary embodiment, the lower electrode 71, the dielectric film 75 and the capacitor electrode 300 have a different planar shape. In more detail, as shown in FIG. 5, referring to a planar shape of the capacitor electrode 300 and a planar shape of the lower electrode 71 or the dielectric film 75, an outline of the capacitor electrode 300 is retreated around the periphery and from an outline of the lower electrode or the dielectric film toward an inner of the lower electrode 71 or the dielectric film 75 by a retreating distance d.

If the retreating distance d approaches zero, the lower electrode 71, the dielectric film 75 and the capacitor electrode 300 have almost the same planar shape. Accordingly, it is possible to enlarge a capacitance of the storage capacitor 70 in the limited non-opening region of the pixel, and it is possible to suppress a generation of flicker on a display screen during operation of the electro-optical device. However, if the lower electrode 71, the dielectric film 75 and the capacitor electrode 300 have almost the same planar shape, during operation of the electro-optical device, it is easy to cause leak current between the capacitor electrode 300 and the lower electrode 71, so that it is likely to cause electric short between the capacitor electrode 300 and the lower electrode 71. Further, electric short between both electrodes may be caused by frequent dust of less than 0.2 µm. For this reason, the retreating distance d is preferably 0.2 µm or more.

To the contrary, if the retreating distance d is largely enlarged so as to further reduce a generation rate of leak current between the capacitor electrode 300 and the lower electrode 71, it is impossible to secure sufficiently a capacitance of the storage capacitor 70. In particular, by a minute pixel pitch, if the pixel pitch is about 10 µm, the retreating distance d greatly has an influence on a width of the storage capacitor 70. In this case, if the retreating distance d is more than 1 µm, an aperture ratio is remarkably decreased.

Accordingly, in the present exemplary embodiment, the retreating distance d is set to a distance enough to secure a resistance against flicker and to reduce or prevent a leak current from being generated between the capacitor electrode 300 and the lower electrode 71, more specifically, in the range of 0.2 µm to 1 µm. In such a manner, it is possible to increase a capacitance of the storage capacitor 70 that is capable of preparing within a limited region.

Construction Between Second Layer and Third Layer of Laminated Structure—First Interlayer Insulating Film On the above-mentioned TFTs 30, the gate electrodes 3a and the relay electrodes 719 and under the storage capacitor 70, the first insulating film 41 made of silicate glass film such as NSG (nonsilicate glass), PSG (phospho-silicate glass), BSG (boro-silicate glass), BPSG (boro-phospho-silicate glass), silicon nitride film or silicon oxide film, and more preferably NSG, is formed.

In the first interlayer insulating film 41, contact holes 81 to electrically connect the highly doped source regions 1d of the TFTs 30 to data lines 6a described below, are formed to pass through the second interlayer insulating film 42 described below. Further, in the first interlayer insulating film 41, contact holes 83 to electrically connect the highly doped drain regions 1e of the TFTs 30 to the lower electrodes 71 constituting the storage capacitors 70, are formed. In addition, in the first interlayer insulating film 41, contact holes 881 to electrically connect the lower electrodes 71 which are capacitor electrodes of pixel potential side constituting the storage capacitors 70 to the relay electrodes 719, are formed. Still further, in the first interlayer insulating film 41, contact holes 882 to electrically connect the relay electrodes 719 to second relay electrodes 6a2 described below are formed to pass through a second interlayer insulating film 42 described below.

Construction of Fourth Layer of Laminated Structure—Data Lines or the Like

By the way, in the fourth layer subsequent to the third layer, the data lines 6a are formed. The data lines 6a have, for example, a three-layered structure of a layer made of aluminum (see reference numeral 41A of FIG. 6), a layer made of titanium nitride (see reference numeral 41TN of FIG. 6) and a layer made of silicon nitride film (see reference numeral 401 of FIG. 6) from below, as shown in FIG. 6. The silicon nitride film is patterned in a little large size so as to cover the underlying aluminum layer and titanium nitride layer.

Further, in the fourth layer, as the same layer as the data lines 6a, a capacitor wire relay layer 6a1 and the second relay electrodes 6a2 are formed. As shown in FIG. 4, in a plan view, these elements are not formed to have a planar shape connected to the data lines 6a, but are formed to be separated from each other for patterning.

By the way, the capacitor wire relay layer 6a1 and the second relay electrodes 6a2 are made of the same film as that of the data lines 6a, and thus have a three-layered structure of a layer made of aluminum, a layer made of titanium nitride and a layer made of plasma nitride from below.

Construction Between Third Layer and Fourth Layer of Laminated Structure—Second Interlayer Insulating Film On the above-mentioned storage capacitors 70 and under the data lines 6a, the second interlayer insulating film 42 made of silicate glass film such as NSG, PSG, BSG or BPSG, silicon nitride film or silicon oxide film, is formed. More preferably, the second interlayer insulating film 42 is formed by a plasma CVD method using TEOS gas. In the second interlayer insulating film 42, the contact holes 81 to electrically connect the highly doped source regions 1d of TFT 30 to the data lines 6a are formed, and contact holes 801 to electrically connect the capacitor wire relay layer 6a1 to the capacitor electrodes 300 which are the upper electrodes of the storage capacitor 70, are formed. In addition, in the second interlayer insulating film 42, the contact holes 882 to electrically connect the second relay electrodes 6a2 to the relay electrodes 719, are formed.

Construction of Fifth Layer of Laminated Structure—Capacitor Wires or the Like

In the fifth layer subsequent to the fourth layer, the capacitor wires 400 are formed. The capacitor wires 400 have a lattice shape so as to extend in X and Y directions in FIG. 4 in a plan view. In particular, a portion of the capacitor wires 400 extending in the Y direction in FIG. 4 is formed to cover the data line 6a and have a width larger than that of the data line 6a. Further, a portion of the capacitor wire 400 extending in the X direction in FIG. 4 has a notched portion disposed at a center of a side of each pixel electrode 9a so as to ensure a region to form a third relay electrode 402 described below.

In addition, referring to FIG. 4, in corners of intersections of the capacitor wires 400 extending in the X and Y directions, triangular portions are formed to fill the corners. The capacitor wires 400 are provided with the triangular portions, and thus it is possible to efficiently shield light to the semiconductor layer 1a of the TFT 30. That is, light incident on the semiconductor layer 1a from above is reflected or absorbed by the triangular portions, not to reach the semiconductor layer 1a. Therefore, it is possible to suppress light leak current and display high quality images with no flicker or the like. The capacitor wires 400 extend around the image display region 10a on which the pixel electrode 9a are arranged, and is electrically connected to a constant voltage source, thereby having a fixed potential.

Further, in the fourth layer, third relay electrodes 402 made of the same film as that of the capacitor wires 400 are formed. The third relay electrodes 402 relays an electric connect between the second relay electrode 6a2 and the pixel electrodes 9a via contact holes 804 and 89 described below. Moreover, the capacitor wires 400 and the third relay electrodes 402 are not formed subsequently in a plan view, but are formed to be separated from each other for patterning.

On the other hand, the above-mentioned capacitor wires 400 and the third relay electrodes 402 has a two-layered structure of a lower layer made of aluminum and an upper layer made of titanium nitride.

Construction Between Fourth Layer and Fifth Layer of Laminated Structure—Third Interlayer Insulating Layer On the data lines 6a and under the capacitor wires 400 described above, a third insulating film 43 made of a silicate glass film such as NSG, PSG, BSG or BPSG, a silicon nitride film or a silicon oxide film is formed. More preferably, the third interlayer insulating film 43 is formed by a plasma CVD method using TEOS gas. In the third interlayer insulating film 43, the contact holes 803 to electrically connect the capacitor wires 400 to the capacitor wire relay layer 6a1 are formed, and the contact holes 804 for electrically connecting the third relay electrodes 402 to the second relay electrodes 6a2 are formed.

Constructions of Sixth Layer and Between Fifth Layer and Sixth Layer of Laminated Structure—Pixel Electrode or the Like In the sixth layer, the pixel electrodes 9a are formed in a matrix type as described above, and on each pixel electrode 9a, the alignment film 16 is formed. And then, under the pixel electrodes 9a, a fourth interlayer insulating film 44 made of a silicate glass film such as NSG, PSG, BSG or BPSG, silicon nitride or silicon oxide, and more preferably NSG, is formed. In the fourth interlayer insulating film 44, the contact holes 89 to electrically connect the pixel electrodes 9a to the third relay electrodes 402 are formed. The pixel electrodes 9a and the TFTs 30 are electrically connected via the contact holes 89, the third relay electrodes 402, the contact holes 804, the second relay electrodes 6a2, the contact holes 882, the relay electrodes 719, the contact holes 881, the lower electrodes 71 and the contact holes 83.

As described above, in the electro-optical device of exemplary embodiments of the present invention, it is constructed the storage capacitor 70 which has high reliability and has a relatively large capacitance in a limited region. Accordingly, it is possible to realize a liquid crystal device that is capable of performing high quality image display.

Manufacturing Method of Electro-Optical Device

A manufacturing process of the electro-optical device of the above-mentioned exemplary embodiment will be now described with reference to FIGS. 7 to 11. FIGS. 7 to 11 are schematic process views illustrating a laminated structure of an electro-optical device in the manufacturing process, in relation to the schematic cross-sectional view of FIG. 6 and a schematic plan view of FIG. 5 selectively showing a storage capacitor 70 (the drawings in relation to FIG. 6 are indicated by (a), and the drawings in relating to FIG. 5 are indicated by (b)). Moreover, hereinafter, a manufacturing process of a storage capacitor 70 that is a feature of the present exemplary embodiment will be described in more detail, but the descriptions on a manufacturing process before and after forming the storage capacitor 70 will be omitted.

Film-Forming

Figure 7A:
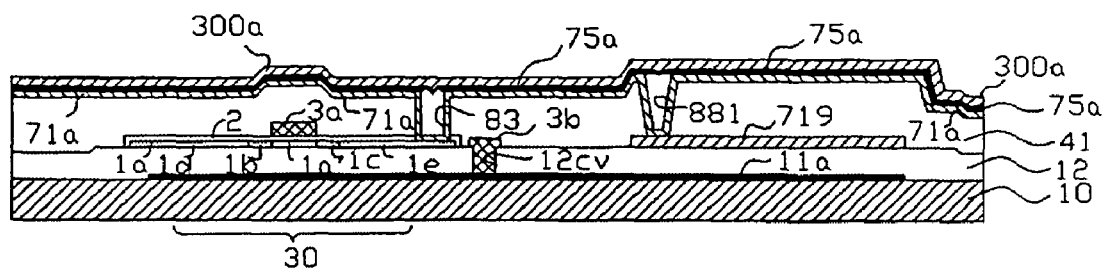
FIGS. 7A–B are schematic process views showing a first step of a manufacturing method of an electro-optical device according to a first exemplary embodiment of the present invention.

First, film-forming will be described with reference to FIGS. 7A–B. In FIG. 7A, on the first interlayer insulating film 41 formed on the TFT array substrate 10, the lower conductive layer 71a serving as the lower electrode 71 of the storage capacitor 70, the intermediate layer 75a serving as the dielectric layer 75 of the storage capacitor 70, and the upper conductive layer 300a serving as the upper electrode 300 of the storage capacitor 70 are sequentially deposited.

In more detail, first, on the first interlayer insulating film 41, polysilicon film is formed using CVD, sputtering or vapor deposition and then phosphorous (P) ions are injected thereinto, to form the lower conductive layer 71a. Next, on the lower conductive layer 71a, the intermediate layer 75a having a two-layered structure of a lower layer made of a silicon oxide film and an upper layer made of a silicon nitride film is formed by vapor deposition or thermal oxidization. In addition, on the intermediate layer 75a, by film-forming polysilicon using CVD, sputtering or vapor deposition while adding phosphine ($PH_3$) gas, the upper conductive layer 300a is formed.

In such a manner, as shown in FIGS. 7(A) and (B), on an upper surface of the first interlayer insulating film 41, the lower conductive layer 71a, the intermediate layer 75a and the upper conductive layer 300a are sequentially deposited. Moreover, the lower conductive layer 71a is made of a material having an etching rate lower than that of a material of the upper conductive layer 300a with respect to a mixed gas of chlorine ($Cl_2$) and hydrogen bromide (HBr).

Mask Forming

Figure 7B:
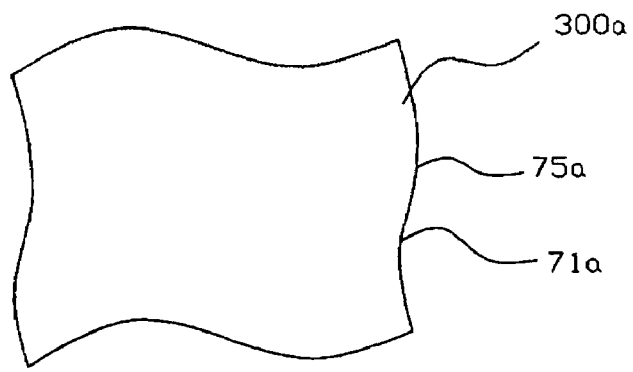
Figure 8A:
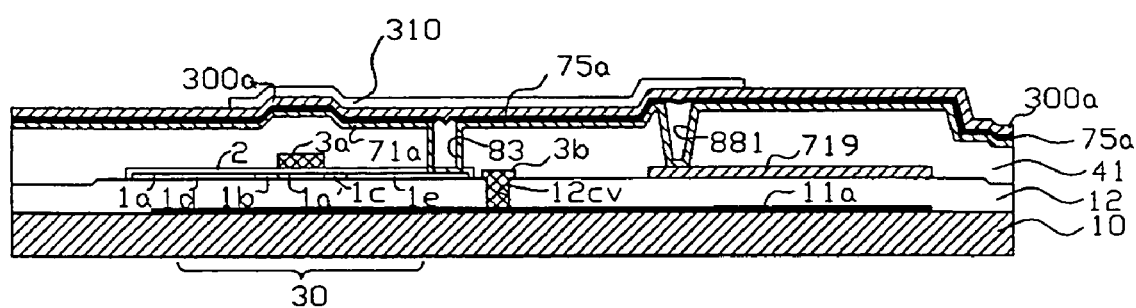
FIGS. 8A–B are schematic process views showing a second step of a manufacturing method of an electro-optical device according to a first exemplary embodiment of the present invention.
Figure 8B:
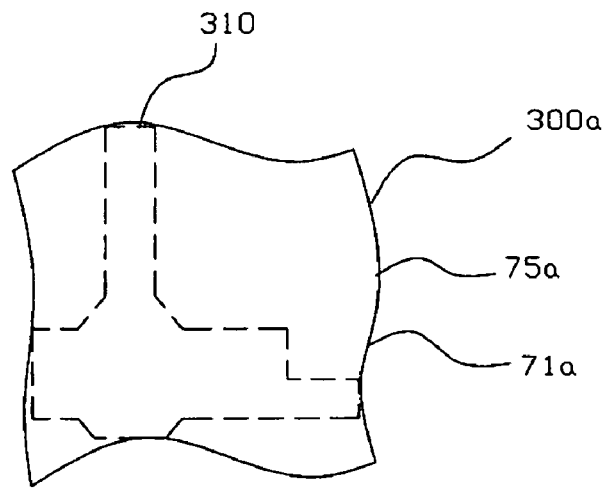

Subsequent to the steps of FIGS. 7A–B, mask forming of FIG. 8 is performed. In FIGS. 8A–B, the mask 310 is formed by forming a resist on a surface of the upper conductive layer 300a and patterning the resist by a photolithography or etching technique. As shown in FIGS. 8(A) and (B), the mask 310 is formed on the upper conductive layer 300a to have a planar pattern corresponding to a planar shape of the upper electrode 300.

Patterning

Figure 9A:
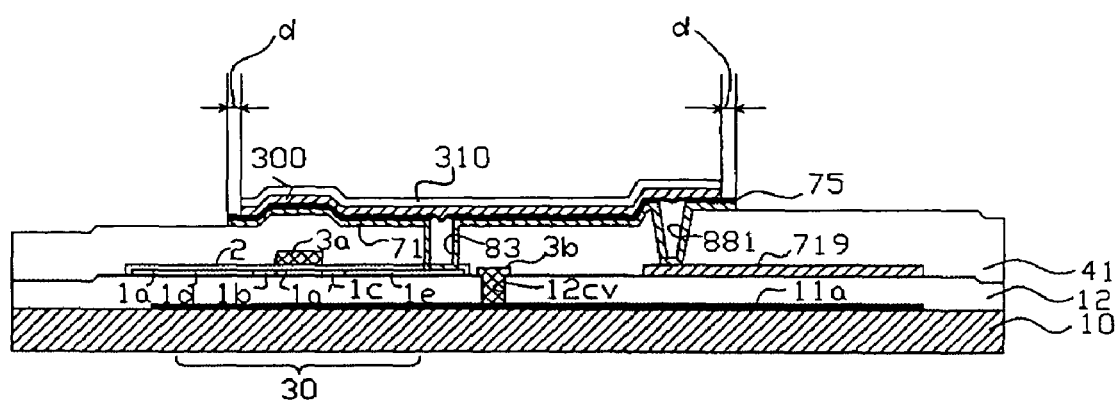
FIGS. 9A–B are schematic process views showing a third step of a manufacturing method of an electro-optical device according to a first exemplary embodiment of the present invention.
Figure 9B:
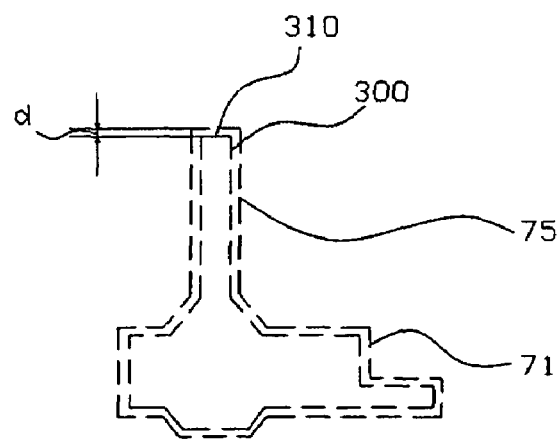

Subsequent to the mask forming of FIGS. 8A–B, patterning of FIGS. 9A–B is performed. In the patterning, the upper conductive layer 300a, the intermediate layer 75a and the lower conductive layer 71a are collectively etched using the mask 310 and thus, the capacitor electrode 300, the dielectric film 75 and the lower electrode 71 are simultaneously patterned. As the etching, etching using an etching gas for polysilicon, and more specifically, inductively coupled plasma (ICP) etching may be used. As the etching gas, herein, used is an etching gas for polysilicon in which chlorine ($Cl_2$) and hydrogen bromide (HBr) are mixed. However, various etching gases may be one other than the specific example. Further, it is possible to use wet etching, as well as dry etching.

As described above, because of a difference in material of the respective layers, with respect the etching gas for polysilicon, an etching rate of the upper conductive layer 300a is about 300 μm/min, an etching rate of the intermediate layer 75 is about 20 μm/min and an etching rate of the lower conductive layer 71a is about 250 μm/min. For this reason, the upper conductive layer 300a is etched relatively fast, while the underlying intermediate layer 75a and the lower conductive layer 71a are etched slowly. By the way, the intermediate layer 75a has an etching rate extremely lower than that of other layers, but since a film thickness of the intermediate layer 75a is very thin by about one tenth, a time required for the etching can fall within a practical range.

As a result, in the upper conductive layer 300a, as compared to the intermediate layer 75a and the lower conductive layer 71a, a side etching proceeds, and as shown in FIGS. 9A–B, an outline of the capacitor electrode 300 is retreated from an outline of the dielectric film 75 and an outline of the lower conductive layer 71. Herein, etching is performed such that a retreating distance reaches a distance d. Generally, end surfaces of the upper electrode and the lower electrode are adjacent to each other in the vicinities of the end surfaces of the dielectric film 75 and thus they may easily contact each other by a manufacturing error, a misalignment, dimensional variations or film remnant. To the contrary, in the present exemplary embodiment, the end surfaces of the capacitor electrode 300 and the lower electrode 71 are spaced apart from each other three-dimensionally.

Figure 10A:
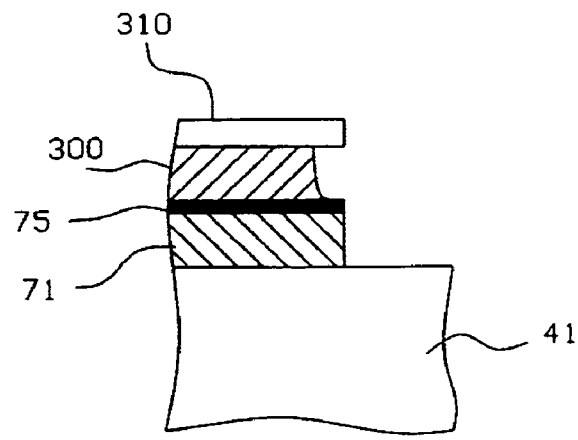
FIGS. 10A–B are partially enlarged schematic views for explaining a shape of an end of a storage capacitor formed in the step of FIG. 9.

FIG. 10(A) shows an end of the storage capacitor 70 shown in FIGS. 9A–B in an enlarged view. In the above description, an example in which the end surface of the dielectric film 75 and the end surface of the lower electrode 71 substantially match and only the capacitor electrode 300 is retreated is described. However, according to the above-mentioned collectively patterning of the upper conductive layer 300a, the intermediate layer 75a and the lower conductive layer 71a, a shape of each of the ends of the storage capacitor 70 has constant variations, in accordance with conditions such as the etching rates of the upper conductive layer 300a with regard to a predetermined etching agent, the intermediate layer 75a and the lower conductive layer 71a or an etching time.

Figure 10B:
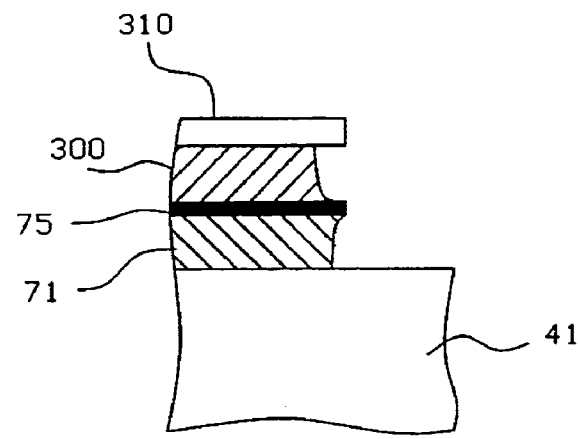

For example, if the lower conductive layer 71a has an etching rate close to an etching rate of the upper conductive layer 300a, and a side etching proceeds during the pattering, end surfaces of the lower electrode 71 are retreated, as shown in FIG. 10(B). In this case, the capacitor electrode 300 and the lower electrode 71 with the dielectric film 75 disposed therebetween are actually spaced apart from each other, not a difference in outline in a plan view, and thus it is possible to reduce or prevent surely electric short or dielectric breakdown from being caused.

Figure 10C:
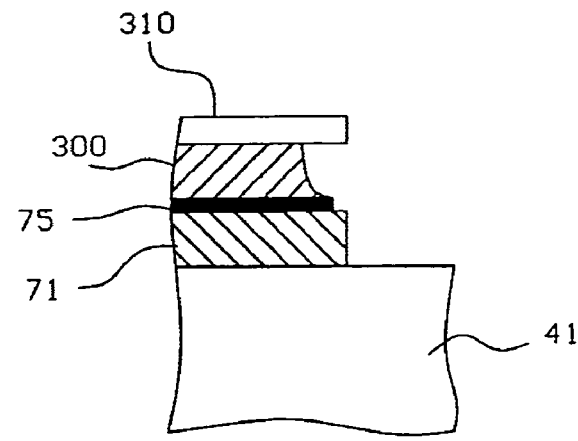

Alternatively, if the lower conductive layer 71a is made of a material having a low etching rate and being etched slowly compared to other layers during the patterning, the end surfaces of the lower electrode 71 protrude from the end surfaces of the dielectric film 75, as shown in FIG. 10(C).

No matter what is used, by the collective etching, the storage capacitor 70 is formed such that the end surfaces of the capacitor electrode 300 and the end surfaces of the lower electrode 71 are spaced apart from each other three-dimensionally.

Mask Removing

Figure 11A:
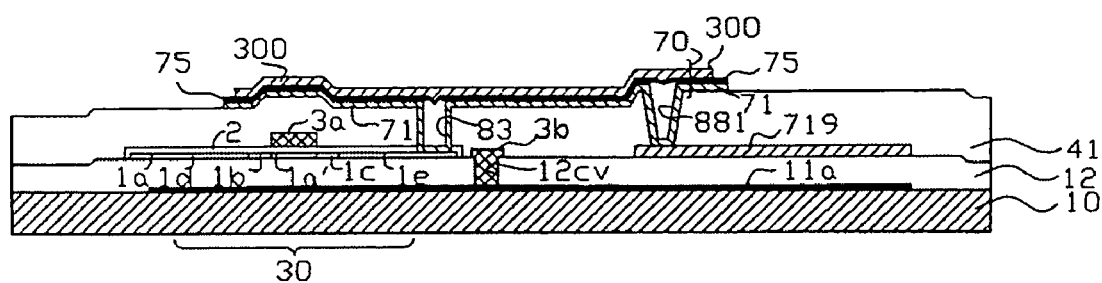
FIGS. 11A–B are schematic process views showing a fourth step of a manufacturing method of an electro-optical device according to a first exemplary embodiment of the present invention.
Figure 11B:
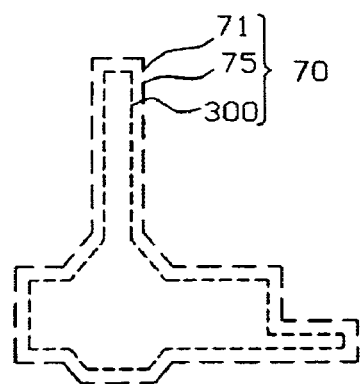

Subsequent to the patterning of FIGS. 9A–B, mask removing of FIGS. 11A–B is performed. In FIG. 11A, the mask 310 is removed, and thus the storage capacitor 70 in which the lower electrode 71, the dielectric film 75 and the upper electrode 300 are sequentially deposited is completed.

Subsequently, the second interlayer insulating film 42 is formed on an entire surface of the TFT array substrate 10 (that is, to cover the storage capacitor 70). At that time, the lower electrode 71 has a planar shape larger than that of the capacitor electrode 300 and the ends of the storage capacitor 70 are step-shaped, and thus the second interlayer insulating film 42 is formed on the storage capacitor 70 with a good coverage. To the contrary, if the lower electrode 71 has a planar shape smaller than that of the capacitor electrode 300, the ends of the storage capacitor 70 has an overhang structure having a projected upper portion. In this case, when the interlayer insulating film is formed, it is difficult to make portions close to the end surfaces of the lower electrode 71 covered with the interlayer insulating film since the end surfaces are hidden by the capacitor electrode 300, which causes voids at the portions. Therefore, a reliability of a device may be lowered.

In the present exemplary embodiment, by using a difference in etching rate of the materials of the upper conductive layer 300a and the lower conductive layer 71a, the storage capacitor 70 in which the capacitor electrode 300 has a planar shape a little smaller than the lower electrode 71 or the dielectric film 75 can be formed by the collective etching. In the storage capacitor 70, a distance between the capacitor electrode 300 and the lower electrode 71 in a schematic cross-sectional surface of the dielectric film 75 is surely provided, though small, in a range of 0.2 μm to 1 μm. Therefore, it is possible to alleviate a concentration of electric field without sacrificing a capacitance, and it is possible to remarkably reduce chances that electric short between both electrodes may be generated. Further, since chances that both electrodes contact are remarkably lowered, it is possible to reduce or prevent dielectric breakdown of the storage capacitor 70.

Further, in the present exemplary embodiment, just one mask may be required for patterning the capacitor electrode 300 and the lower electrode 71 constituting the storage capacitor 70. That is, by forming the upper conductive layer 300a and the lower conductive layer 71a with different material and adjusting a difference in etching rate of both layers, it is possible to pattern the storage capacitor 70 with once etching such that the end surfaces of the capacitor electrode 300 are retreated from the end surfaces of the lower electrode 71. Therefore, it is very advantageous for providing an efficient manufacturing process. If many masks are used, an increased number of resist film-forming, etching and removal are required, and then a manufacturing cost becomes remarkably high. Further, the production yield is lowered due to a misalignment.

In addition, since the upper conductive layer 300a, the intermediate layer 75a and the lower conductive layer 71a are collectively etched, an entire patterning is performed within the same chamber. Further, a course on a manufacturing line is reduced, and a manufacturing efficiency is advanced.

Therefore, according to the present exemplary embodiment, it is possible to simply form the storage capacitor 70 that is highly reliable and has a large capacitance. In particular, in the liquid crystal device, the storage capacitor 70 is arranged at a limited region that is a non-opening region of each pixel, but it is also possible to increase a capacitance by applying the storage capacitor 70 to other portions. Further, if the storage capacitor 70 is arranged within the non-opening region and the dielectric film 75 is not formed an entire surface of the interlayer insulating film 41, it is possible to use nitride film as the dielectric film 75 without deteriorating display quality. As a result, it is possible to construct a liquid crystal device that is capable of high quality display. Further, by forming the storage capacitor in such a manner, it is possible to advance the production yield.

MODIFIED EXAMPLE

A modified example of the first exemplary embodiment will be now described. In the modified example, the same reference numerals as the first exemplary embodiment represent like elements, and the descriptions will be omitted.

Modified Example 1

In the modified example, during patterning of the storage capacitor 70, retreating the mask 310 is performed such that a planar shape of the mask 310 becomes small, simultaneously with etching. More specifically, by a rubbing treatment using oxygen plasma (so called "$O_2$ cleaning"), an outline of the mask 310 shown in FIGS. 9A–B is retreated by an equal distance around the periphery, whereby a mask 311 is prepared. In such a manner, an outline of the mask 311 is retreated from an outline of an upper conductive layer 301a.

Moreover, a timing for the mask treating may be arbitrary. For example, in the upper conductive layer 300a, the intermediate layer 75a and the lower conductive layer 71a, the mask retreating is performed after a vertical etching on the respective layers or during etching on the upper conductive layer 300a.

Figure 12A:
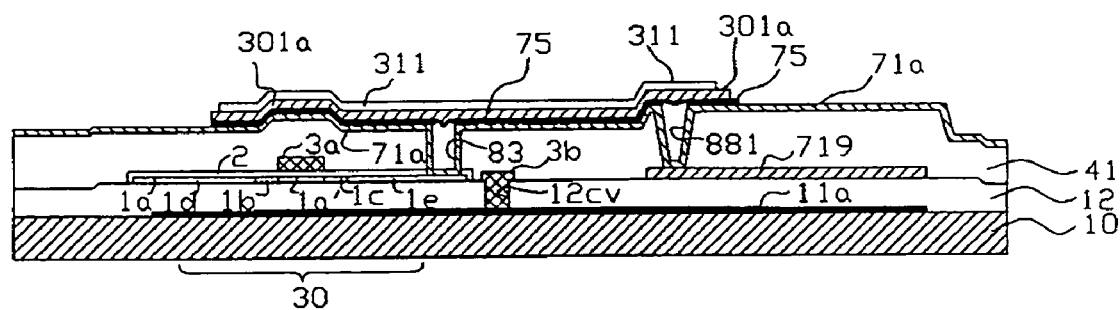
FIGS. 12A–B are schematic process views showing a modified example of a manufacturing method of an electro-optical device according to a first exemplary embodiment of the present invention.

FIGS. 12(A) and (B) shows an example in which the mask retreating is performed after a vertical etching on the intermediate layer 75a and before etching of the lower conductive layer 71a. In FIGS. 12(A) and (B), the mask 311 is prepared by retreating the edges of the mask 311. Further, in the first exemplary embodiment, before the mask retreating, the upper conductive layer 300a is already patterned into the capacitor electrode 300, but, in the present modified example, by pattering the upper conductive layer 301a, the upper conductive layer 301a which has a planar shape corresponding to the mask 311, is obtained. Since the dielectric film 75 has a low etching rate, the outline of the dielectric film 75 is formed to exceed the outline of the upper conductive layer 301a.

Figure 12B:
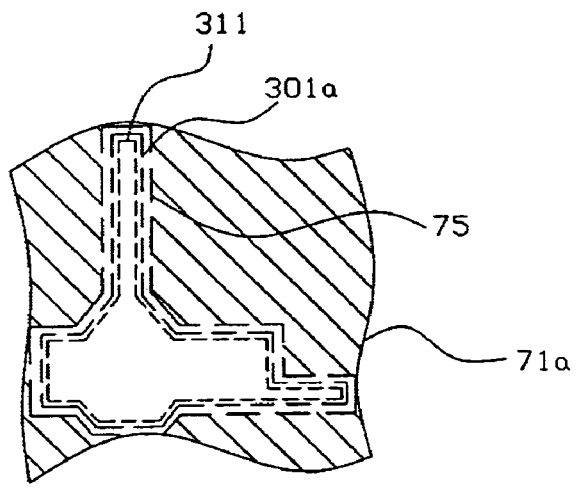
Figure 13A:
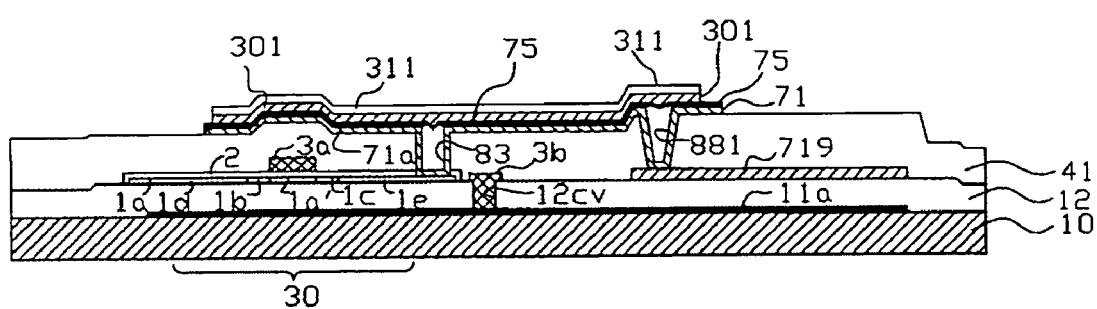
FIGS. 13A–B are schematic process views subsequent to FIG. 12.
Figure 13B:
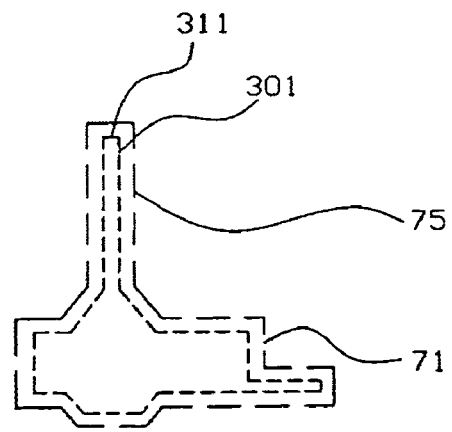

Herein, after the mask retreating of FIG. 12, a patterning is continued as shown in FIG. 13. In FIG. 13, the upper conductive layer 301a is etched through the mask 311. At the same time, the lower conductive layer 71a is etched through the dielectric film 75.

As a result, as shown in FIGS. 13(A) and (B), the upper conductive layer 301a is patterned to have a planar shape corresponding to the mask 311, whereby a capacitor electrode 301 is formed. The end surfaces of the capacitor electrode 301 is retreated more than the end surfaces of the capacitor electrode 300 in the first exemplary embodiment, and thus a distance between the end surfaces of the capacitor electrode 301 and the end surfaces of the lower electrode 71 becomes larger.

In the present exemplary embodiment, since the mask retreating is performed with "$O_2$ cleaning", it is possible to retreat the mask 310 relatively easily and equally. Accordingly, it is possible to manufacture relatively simply a storage capacitor in which the capacitor electrode 301 has a planar shape equally smaller around the periphery than that of the lower electrode 71.

Besides, since an outline shape of the capacitor electrode 301 can be adjusted by adjusting a retreating distance of the mask 310, it is possible to simply form the capacitor electrode 301, which has a little difference in outline with the lower electrode 71, using one mask. That is, it is possible to suitably increase an patterning precision of the capacitor electrode 301, and it is possible to manufacture a storage capacitor relatively easily in which a little difference in outline in a range of 0.2 µm to 1 µm is realized with a high precision.

Moreover, if the mask 310 is retreated simultaneously with a patterning of the upper conductive layer 301a, it is possible to reduce a manufacturing time and simplify a manufacturing process. For example, by mixing oxygen plasma for $O_2$ cleaning into an etching gas, the above step may be performed. As a result, the capacitor electrode 301 has tapered end surfaces. In this case, since the storage capacitor can be covered with the second interlayer insulating film 42 with a good coverage at the ends of the storage capacitor, it is possible to reduce or prevent voids.

Modified Example 2

In the first exemplary embodiment, the patterning of the storage capacitor 70 is performed with a collective etching, but an etching gas on the intermediate layer 75a may be changed. Generally, the intermediate layer 75a has an incomparably etching rate lower than that of a conductive layer against an etching gas for the conductive layer (in the first exemplary embodiment, polysilicon). Thus, even if the intermediate layer 75a has a thin film thickness, a process of etching of the intermediate layer 75a may be slow. In this case, it is rather advantageous to perform etching using an etching gas for the intermediate layer 75a than a collective etching. Further, if a chamber into which various types of etching gases may be introduced is used, it is possible to perform an entire patterning within the same device and chamber.

At that time, for etching of the intermediate layer 75a, a mixed gas of, for example, $CHF_3$, $CF_4$ and Ar may be used. With respect to the etching gas, the intermediate layer 75a made of silicon nitride has an etching rate of about 200 µm/min and the intermediate layer 75a made of silicon oxide has an etching rate of about 480 µm/min. To the contrary, since polysilicon has a low etching rate of about 40 to about 60 µm/min, it is possible to concentratively etch the intermediate layer 75a, and then it is possible to form the storage capacitor 70 in which a shape of each end is precisely controlled.

Second Exemplary Embodiment

Next, a second exemplary embodiment of the present invention will be described. Moreover, in the present exemplary embodiment, different portions from those of the first exemplary embodiment will be mainly described, and the same reference numerals as the first exemplary embodiment represent like elements and the descriptions will be omitted.

In an electro-optical device of the present exemplary embodiment, instead of the storage capacitor 70 of the first exemplary embodiment, a storage capacitor 70A in which a lower electrode 72, a dielectric film 76 and a capacitor electrode 302 are sequentially deposited is provided. Among the elements, the dielectric film 76 is made of a material having an etching rate lower than those of materials of the capacitor electrode 302 and the lower electrode 72 with respect to a predetermined etching agent. For example, while the capacitor electrode 302 and the lower electrode 72 are made of a material of the same composition or different composition selected from conductive metallic material, conductive polysilicon and conductive metallic silicide, the dielectric film 76 is made of silicon nitride or silicon oxide.

The storage capacitor 70A can be formed as described below.

To begin with, a lower conductive layer, an intermediate layer and an upper conductive layer are sequentially deposited. The respective layers are film-formed using materials of the lower electrode 72, the dielectric film 76 and the capacitor electrode 302 described above. Next, the laminated structure is simultaneously and collectively patterned by a collective etching using a mask 312. And then, the mask 312 is removed.

Figure 14A:
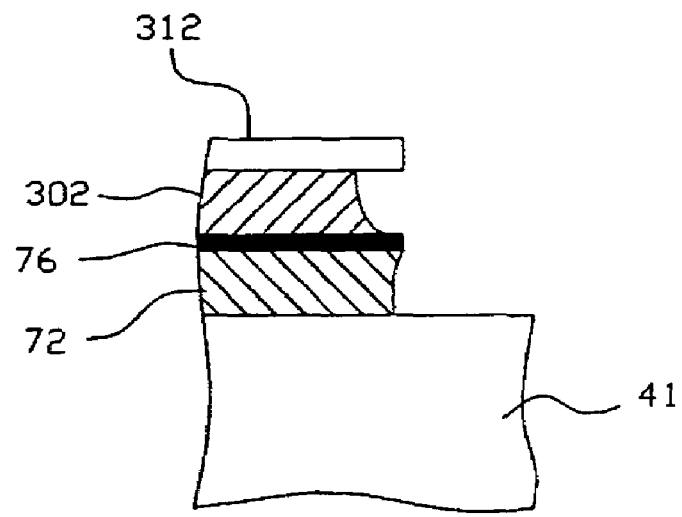
FIGS. 14A–B are schematic partially enlarged schematic views for explaining a shape of an end of a storage capacitor formed in a manufacturing process of an electro-optical device according to a second exemplary embodiment of the present invention.

FIGS. 14(A) and (B) are enlarged views showing an end of the storage capacitor 70A when etching, and partial construction views corresponding to FIG. 10 of the first exemplary embodiment. In the present exemplary embodiment, as shown in FIG. 14, etching proceeds. That is, FIG. 14(A) shows a case in which the upper and lower conductive layers have a substantially same etching rate which is higher than that of the intermediate layer. In this case, the capacitor electrode 302 and the lower electrode 72 with the dielectric film 76 interposed therebetween are actually spaced apart from each other, not a difference in outline in a plan view. Therefore, it is possible to surely reduce or prevent electric short or dielectric breakdown.

Figure 14B:
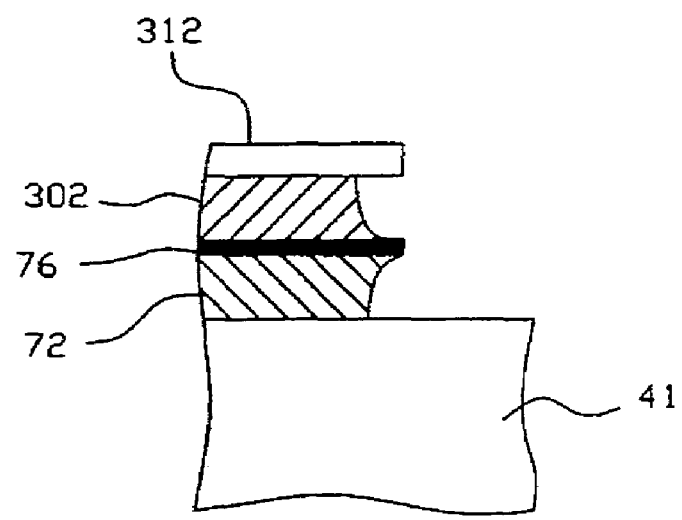

Further, FIG. 14(B) shows another case in which the upper and lower conductive layers have an etching rate higher than that of the intermediate layer and the upper conductive layer has an etching rate higher than that of the lower conductive layer. In this case, it is possible to form in such a manner that the end surfaces of the lower electrode 72 are not retreated from the end surfaces of the dielectric film 76.

Figure 15A:
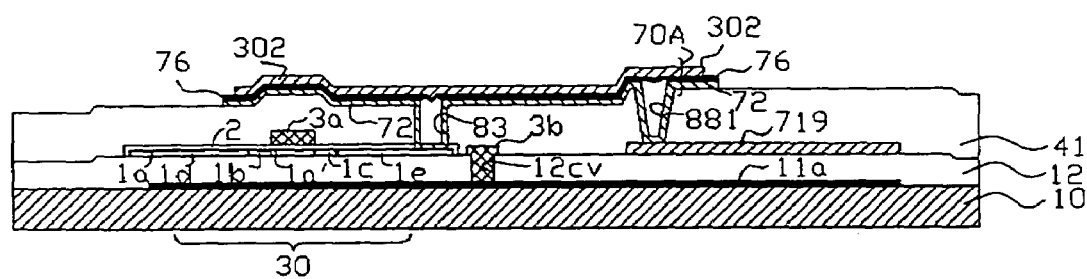
FIGS. 15A–B are schematic process views showing a state in which the storage capacitor shown in FIG. 14 is formed in the manufacturing process of the electro-optical device according to the second exemplary embodiment of the present invention.
Figure 15B:
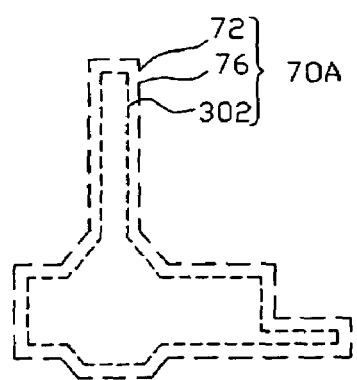

No matter what is used, as a result, it is possible to form the storage capacitor 70A in which the dielectric film 76 has a planar shape larger than those of the capacitor electrode 302 and the lower electrode 72, as shown in FIG. 15.

However, from a view of pressure resistance of the storage capacitor 70A, it is minimally required that the end surfaces of any one of the capacitor electrode 302 and the lower electrode 72 are retreated from the end surfaces of the dielectric film 76. Thus, it is not necessary to form the end surfaces of all of the capacitor electrode 302 and the lower electrode 72 to be retreated from the end surfaces of the dielectric film 76. As shown in FIG. 14(A), the lower electrode 72 has a planar shape smaller than that of the dielectric film 76, the ends of the storage capacitor 70A have an overhang structure. In this case, when the second interlayer insulating film 42 is formed right above the storage capacitor 70A, it is difficult to make portions close to the end surfaces of the lower electrode 72 covered with the second interlayer insulating film 42, which causes voids at the portions. Therefore, a reliability of a device may be lowered. Thus, as shown in FIG. 14(B), it is preferable for the lower electrode 72 to have a planar shape not so smaller than that of the dielectric film 76. That is, it is preferable that the end surfaces of the lower conductive layer be retreated not so much from the end surfaces of the intermediate layer 76.

As described above, in the present exemplary embodiment, by using a difference in etching rate of materials of the upper conductive layer, the intermediate layer and the lower conductive layer, it is possible to form the storage capacitor 70A in which the capacitor electrode 302 and the lower electrode 72 have a planar shape a little smaller than that of the dielectric film 76, by a collective etching. In the storage capacitor 70A, the capacitor electrode 302 and the lower electrode 72 spaced apart from each other by a little distance are provided in the end surfaces of the dielectric film 76. Therefore, it is possible to alleviate a concentration of electric field without sacrificing a capacitance, and it is possible to remarkably reduce chances that electric short between both electrodes may generated. Further, it is possible to reduce chances that both electrodes contact, and it is possible to reduce or prevent dielectric breakdown of the storage capacitor 70A.

Further, in the present exemplary embodiment, since the capacitor electrode 302, the dielectric film 76 and the lower electrode 72 constituting the storage capacitor 70A are collectively patterned, it is possible to perform an entire patterning within the same chamber, and thus it is possible reduce a manufacturing time and advance a manufacturing efficiency. At the same time, since a mask required for the patterning is just one, it is possible to suppress a number of the resist film-forming and etching. Therefore, it is possible to reduce a manufacturing cost, and it is possible to reduce or prevent the production yield from being lowered due to misalignment.

Accordingly, according to the present exemplary embodiment, it is possible to simply form the storage capacitor 70A which is high reliable and has a high capacitance. In particular, in a liquid crystal device, the storage capacitor 70A is arranged at a limited region that is a non-opening region of each pixel, but it is also possible to increase a capacitance by applying the storage capacitor 70A to other portions. Further, if the storage capacitor 70A is arranged within the non-opening region and the dielectric film 76 is not formed on an entire surface of the interlayer insulating film 41, it is possible to use nitride film as the dielectric film 76 without deteriorating display quality. As a result, it is possible to construct a liquid crystal device that is capable of high quality display. Further, by forming the storage capacitor in such a manner, it is possible to advance the production yield.

Moreover, in the present exemplary embodiment, similar to the first modified example of the first exemplary embodiment, it is possible to form the capacitor electrode 302 in which the end surfaces are further retreated by retreating the mask 312 or the end surfaces are tapered angles.

Electronic Apparatus

Next, various electronic apparatuses to which the electro-optical devices described in detail above are applied will be now described.

Projector

First, a projector in which a liquid crystal device that is one of the above-mentioned electro-optical devices is used as a light bulb will be now described.

Figure 16:
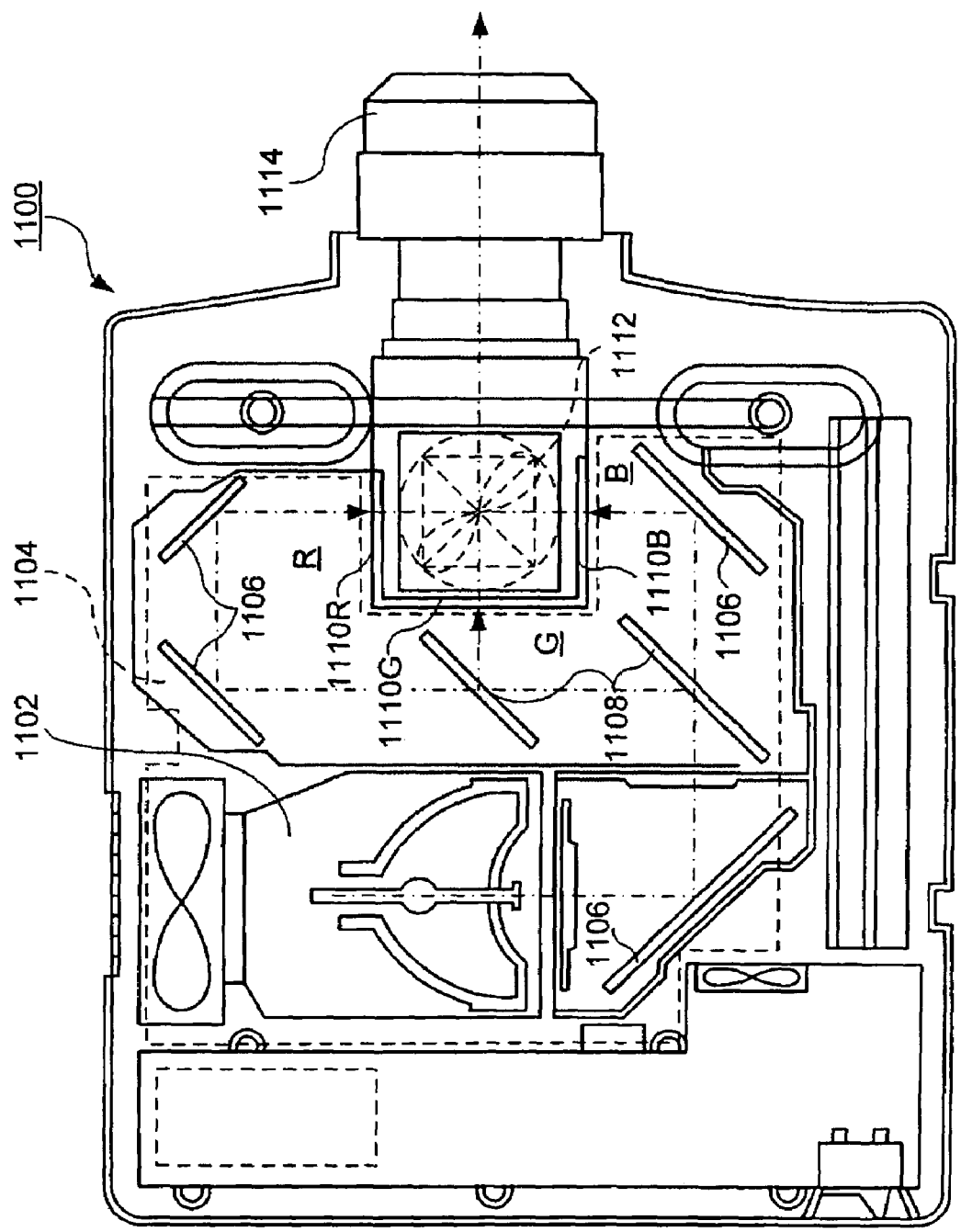
FIG. 16 is a schematic cross-sectional view showing a construction of a projector as an example of an electronic apparatus to which the electro-optical device is applied.

FIG. 16 is a schematic plan view showing an example of a construction of the projector. As shown in FIG. 16, on an inside of the projector 1100, a lamp unit 1102 made of a whit light source such as a halogen lamp is provided. Light emitted from the lamp unit 1102 are separated into three primary colors of R (red), G (green) and B (blue) by four mirrors 1106 and two dichroic mirrors 1108 which are arranged in a light guide 1104, and are incident on liquid crystal devices 1110R, 1110B and 1110G which are light bulbs corresponding to the respective primary colors. The constructions of the liquid crystal devices 1110R, 1110B and 1110G are the same as that of the above-mentioned electro-optical device and are driven with signals of primary colors R, G and B that are supplied from an image signal processing circuit. And then, light modulated by the liquid crystal devices is incident on a dichroic prism 1112 in three directions. In the dichroic prism 1112, while light of R and B are refracted by 90 degrees, light of G goes right on. Accordingly, images of the respective colors are combined and pass through a projecting lens 1114, and thus a color image is projected on a screen or the like.

Mobile Type Computer

Figure 17:
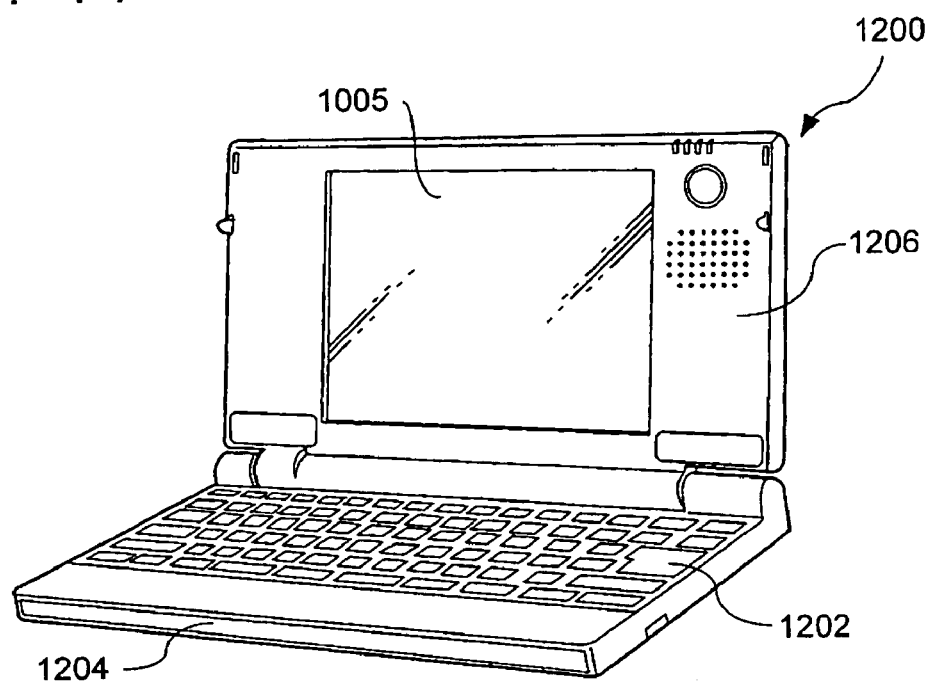
FIG. 17 is a schematic cross-sectional view showing a construction of a personal computer as an example of an electronic apparatus to which the electro-optical device is applied.

Next, an example in which a liquid crystal device which is one of the above-mentioned electro-optical devices is applied to a mobile type personal computer will be now described. FIG. 17 is a schematic perspective view showing a construction of the personal computer. In FIG. 17, the computer 1200 includes a main body portion 1204 provided with a keyboard 1202 and a liquid crystal display unit 1206. The liquid crystal display unit 1206 is made by adding a backlight to the above-mentioned electro-optical devices.

Cellular Phone

Figure 18:
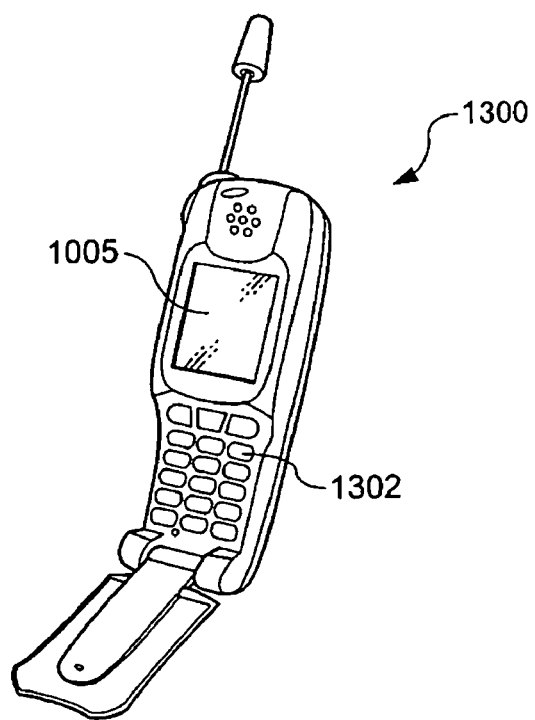
FIG. 18 is a schematic cross-sectional view showing a construction of a cellular phone as an example of an electronic apparatus to which the electro-optical device is applied.

In addition, an example in which a liquid crystal device which is one of the above-mentioned electro-optical devices is applied to a cellular phone will be now described. FIG. 18 is a schematic perspective view showing a construction of the cellular phone. In FIG. 18, the cellular phone 1300 is provided with a plurality of operating buttons 1302 and a reflection type liquid crystal device 1005. If necessary, on a front surface of the reflection type liquid crystal device 1005, a front light is provided.

Other than the electronic apparatuses described with reference to FIGS. 16 to 18, the liquid crystal device which is one of the electro-optical devices can be applied to various electronic apparatuses such as a liquid crystal television, a cellular phone, an electronic organizer, a word processor, a view finder type or a monitor direct viewing type video tape recorder, a workstation, a videophone, a POS terminal, a touch panel, an electrophoresis device such as a electronic paper, and a display device using an electron-emitting element such as field emission display and surface-conduction electron-emitter display.

Moreover, the substrate for the electro-optical device and the substrate for the semiconductor device of the present invention are provided with a capacitor according to the present invention, and they can be applied to various devices other than the liquid crystal device. Further, the electro-optical device may be provided with the substrate for the electro-optical device of the present invention and may include liquid crystal devices or organic EL devices having a different construction from that of the above-mentioned liquid crystal device.

The present invention is not limited to the above-mentioned exemplary embodiments, but can be appropriately modified without departing from the subject matter and spirit of the present invention read on the claims and specification. In accordance with such a modification, a method of manufacturing a substrate for an electro-optical device, the substrate for the electro-optical device, the electro-optical device and an electronic apparatus including the same, a method of manufacturing a substrate for a semiconductor device and the substrate for the semiconductor device are also fallen within the technical scope of the present invention.

What is claimed is:

1. A method of manufacturing a substrate for an electro-optical device provided with a capacitor thereon, comprising:

sequentially depositing, above the substrate, a lower conductive layer which is a lower electrode of the capacitor, an intermediate layer which is a dielectric film of the capacitor, and an upper conductive layer which is an upper electrode of the capacitor, the lower conductive layer being made of a material having an etching rate lower than an etching rate of a material of the upper conductive layer with respect to a predetermined etching agent;

forming a mask having a predetermined planar pattern on the upper conductive layer;

patterning the upper conductive layer, the intermediate layer, and the lower conductive layer by etching with the mask, a first etching agent being applied to at least the upper conductive layer and the lower conductive layer; and removing the mask, patterning including a collective etching of the upper conductive layer, the intermediate layer, and the lower conductive layer.

2. The method of manufacturing a substrate for the electro-optical device according to claim 1, performing, in the patterning, the etching of the intermediate layer using an etching agent different from the first etching agent.

3. The method of manufacturing a substrate for the electro-optical device according to claim 1, further comprising:

retreating the mask such that the planar shape of the mask becomes smaller simultaneously with a progression of etching during the patterning.

4. The method of manufacturing a substrate for the electro-optical device according to claim 3, retreating, in the mask retreating, an outline of the mask on the substrate at an equal distance around a periphery of the mask.

5. The method of manufacturing a substrate for the electro-optical device according to claim 1, making the upper conductive layer and the lower conductive layer of materials having a same composition.

6. A method of manufacturing a substrate for an electro-optical device provided with a capacitor thereon, comprising:

sequentially depositing above the substrate a lower conductive layer which is a lower electrode of the capacitor, an intermediate layer which is a dielectric film of the capacitor, and an upper conductive layer which is an upper electrode of the capacitor, the intermediate layer being made of a material having an etching rate lower than an etching rate of a material of the lower conductive layer and the upper conductive layer with respect to a predetermined etching agent;

forming a mask having a predetermined planar pattern on the upper conductive layer;

collectively patterning the upper conductive layer, the intermediate layer, and the lower conductive layer by etching with the mask and the predetermined etching agent; and removing the mask, in sequentially depositing, the lower conductive layer being made of a material having an etching rate lower than that of a material of the upper conductive layer with respect to a predetermined etching agent.

* * * * *